United States Patent [19]

Heartz

[11] 4,205,389

[45] May 27, 1980

[54] APPARATUS FOR GENERATING A RASTER IMAGE FROM LINE SEGMENTS

[75] Inventor: Robert A. Heartz, Deland, Fla.

[73] Assignee: General Electric Company, Philadelphia, Pa.

[21] Appl. No.: 886,974

[22] Filed: Mar. 15, 1978

Related U.S. Application Data

[63] Continuation-in-part of Ser. No. 726,304, Sep. 24, 1976, abandoned.

[51] Int. Cl.[2] .......... G06F 3/14

[52] U.S. Cl. .......... 364/900; 340/744; 340/747; 340/793; 364/521

[58] Field of Search ... 364/900 MS File, 200 MS File, 364/521; 35/10.4; 340/324 R, 324 A, 324 AD, 724, 731, 744, 747, 793

[56] References Cited

U.S. PATENT DOCUMENTS

| | | | |
|---|---|---|---|
| 3,497,870 | 2/1970 | Balding | 364/521 X |
| 3,527,980 | 9/1970 | Robichaud et al. | 364/521 X |
| 3,648,250 | 3/1972 | Low et al. | 364/900 |
| 3,675,208 | 7/1972 | Bard | 364/900 |
| 3,764,719 | 10/1973 | Dell | 35/10.4 |
| 3,818,475 | 6/1974 | Hussey | 340/324 A |
| 3,909,605 | 9/1975 | Rowe et al. | 35/10.4 |
| 4,023,025 | 5/1977 | Rowe et al. | 35/10.4 X |

*Primary Examiner*—Melvin B. Chapnick

*Attorney, Agent, or Firm*—Allen E. Amgott; Raymond H. Quist

[57] ABSTRACT

Apparatus for processing data whereby a digital control signal is generated for effecting the presentation of a selected portion of a map image on a raster display. The data includes stored data words describing characteristics of line segments utilizable to construct the image. The line segments include line vectors representative of elongated features of the image and boundary vectors identifying boundaries between image areas of different brightness. Processing of the data is accomplished by means of two control loops. The first control loop performs selected macrosteps including arithmetic manipulations, on the data words to effect generation of the digital control signal. The second control loop effects selection of the macrosteps to be performed by the first loop and routes the data words within the generator in response to the instant data being processed by the generator. In accordance with an additional feature of the invention, data words are generated for defining intersections to be displayed adjacent each intersection of a line segment with a raster line where the line segment has a slope of less than a predetermined magnitude. These additional intersections prevent the stepped appearance of line segments intersecting raster lines at small angles.

4 Claims, 14 Drawing Figures

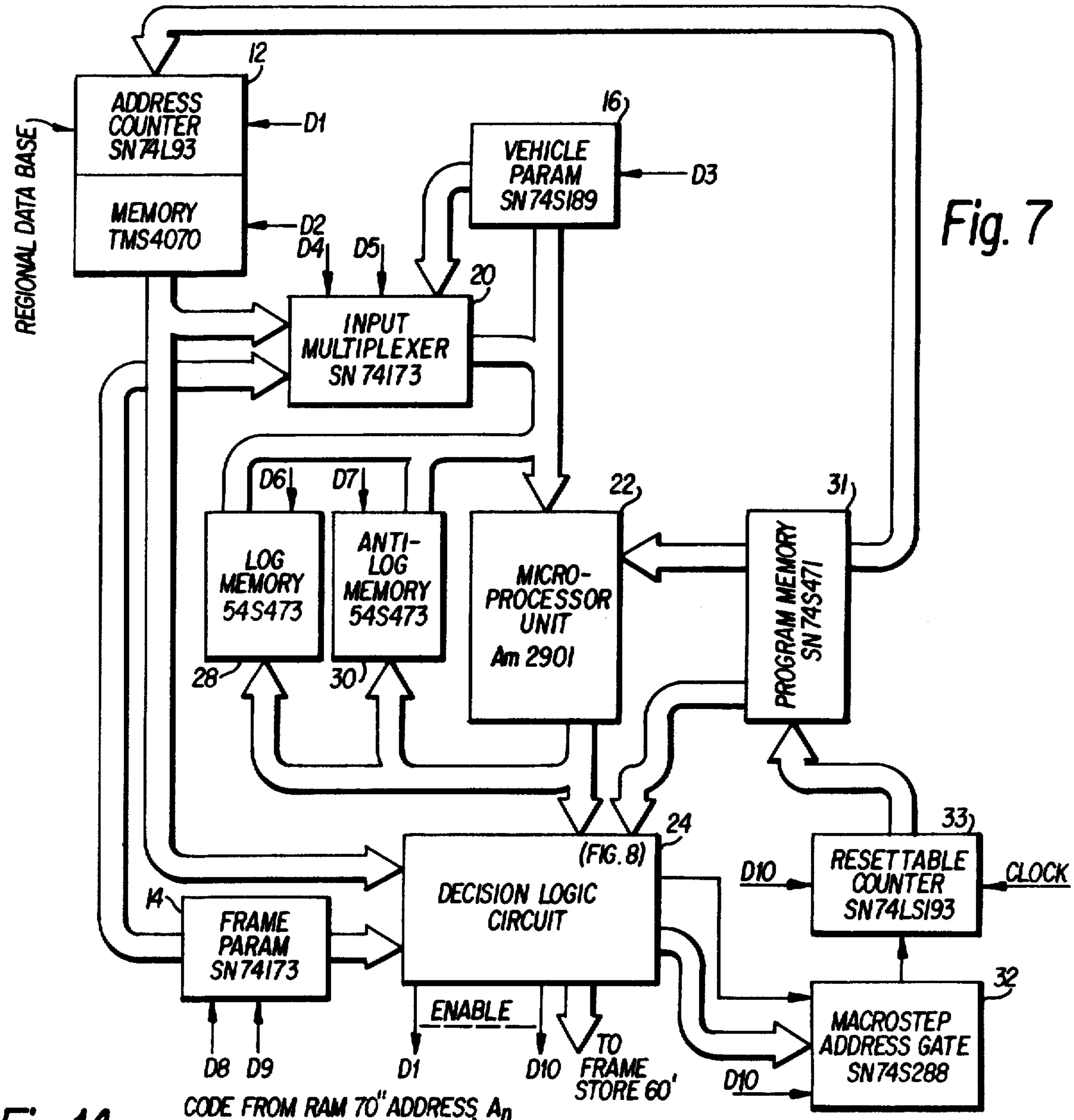
Fig. 7
Fig. 14
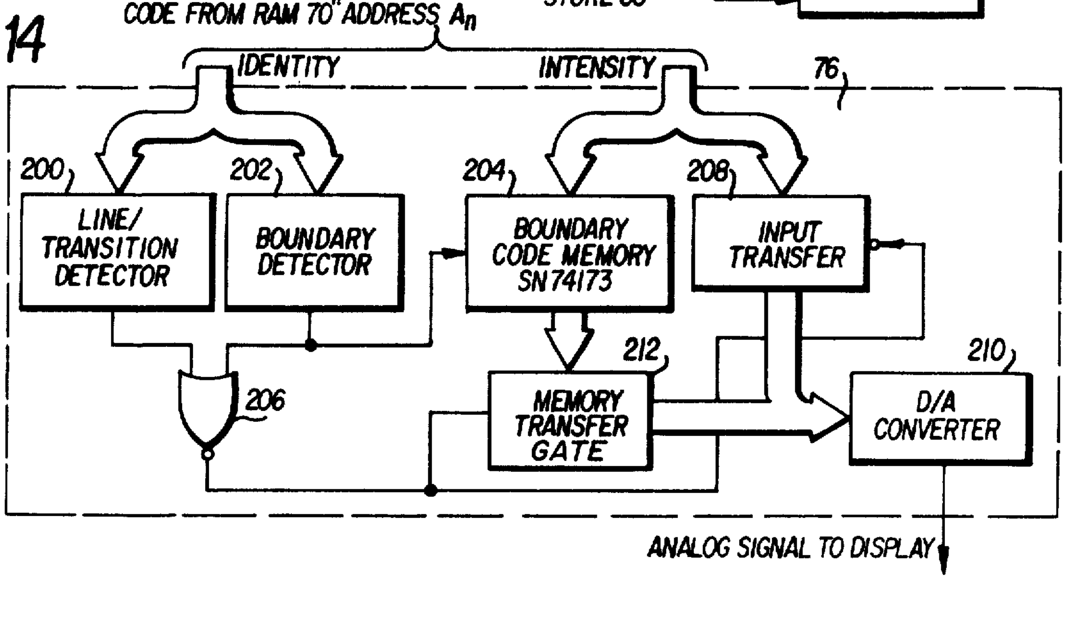

APPARATUS FOR GENERATING A RASTER IMAGE FROM LINE SEGMENTS

RELATED U.S. PATENT APPLICATION

This is a continuation-in-part of the now abandoned application Ser. No. 726,304, filed on Sept. 24, 1976, by the present applicant and titled COMPACT DIGITAL MAP DISPLAY GENERATOR.

BACKGROUND OF THE INVENTION

1. Field of the Invention

This invention pertains to the generation of maps to be displayed on a CRT by digital processing of digitally encoded geodetic and cultural data that defines the environment to be mapped.

2. Description of the Prior Art

A special problem exists in providing a night-flying aviator with information on the terrain over which he is flying. Scheduled flights to large airports may be adequately served by elaborate instrumentation and flight control instructions, although knowledge of the surrounding terrain is desirable. But low flying military aircraft, or those performing emergency services in sparsely settled areas, rely very much on visual contact; illumination sufficient for seeing conventional maps may impair dark adaption and many maps may be needed to cover the possible range of modern aircraft. A self-luminous display like the face of a cathode ray tube does not require illumination of the background, and may be biased down to the very lower limit of visibility so that it impairs dark adaptation negligibly. Television-type techniques can obviously be employed to present an image of a printed map; a flying-spot scanner has been employed to scan holograms in a similar application. Such a display is clearly limited by an available number of maps and has limited flexibility in the choice of data to be displayed. Generation of maps from stored digital environmental data is known in the art; simulation of radar presentations from similar data is also known and described as "radar mapping" (somewhat loosely since the radar presentation itself may well not be a true map). The applicant's U.S. Pat. Nos. 3,769,442 and 3,883,861 and 4,017,985, and 3,892,051 of Bunker (all assigned to the assignee of this application) variously describe the preparation of digital bases for terrain simulation and the generation of simulated images for pilot training. None of these inventions is subject to size, weight and power constraints of airborne equipment.

Another important constraint to be met is time. A general purpose digital computer can perform all the functions required to generate a map display but, because of the large amounts of data to be processed, it would take many minutes and in some cases over an hour, to generate a single display. This, in airborne applications, is unacceptable. Thus special, dedicated, processing loops to maximize data throughput are required and are a unique feature of this invention.

Effective functioning of a map is subjective; that is, the map is good if it transfers required information accurately and easily to the viewer. A line map gives no sense of altitude, unless it includes elevation contours, which require time for their interpretation. Visual image simulation gives an indication of elevation; but it requires somewhat complicated (and hence equipment-costly) computation and it conceals what lies beyond the next hill, which information may be the reason why a map is needed at all.

SUMMARY OF THE INVENTION

The various lines defining terrain topography and cultural features, which in reality are often curved or crooked, are represented to a sufficient degree of approximation by a succession of straight lines defined by their end points. Data must be stored for the entire region over which the vehicle using the equipment may reasonably be expected to travel, although only a small fraction of this data will usually be required for the generation of any individual map in the region. Both for storage economy and for procedural convenience, the data store is preferably of the incremental or delta form. The X and Y coordinates of the initial point in the data sequence are given in full, together with a code indicating their particular nature as initial coordinates; the coordinates of each successive point are given as increments to the coordinates of the immediately preceding point. More conventionally stored data having coordinates of various points stored in full may be converted by a general purpose computer into the delta form. U.S. Pat. No. 3,883,861, incorporated by reference, describes an alternative method which may often be preferred. In the delta method, successive data points are necessarily in a continuous sequence or string. This has the advantage for computation that it automatically establishes an order in which the data points are to be processed. It also permits encoding with the coordinate data indication of the slope or the brightness of the terrain on either side of the line segment initiated by the point, or alternative information such as slope direction pertinent to the brightness of the display identified with the point. Such line segments are called boundary vectors. It is possible to include isolated point targets in the data string by indicating that lines leading to and from the point are unseen, or hidden. Elongated features such as roads and small streams can be encoded as a line intensity. These are called line vectors. The code associated with each point selects the way in which a data base word is to be processed and displayed.

The intention of producing only a planar map presentation permits omission of altitudes per se; but related information of terrain slope directions uses some store capacity. This is useful to permit shading terrain which slopes toward the observer lighter than that which slopes away from him, to produce a simulation relief. When a line between two points bounds two flat surfaces, such as water and a flat shore, coding indicates the brightness of each. It must be borne in mind that the primary objective is a map whose conventions render it readily readable, as differing colors on a printed map differentiate states whose actual terrain colors are the same. The particular brightness differences employed are a matter of judicious choice and the inherent flexibilities of the digital approach permit on-line operator choice of the nature of the displayed information.

The incremental nature of the region data requires that each point in the store be read out, beginning with the starting point, and the increments for each succeeding point be added cumulatively to the starting point coordinates. The desired origin coordinates for the map to be presented must be provided as arbitrary data; these will ordinarily be the best known values of the vehicle position. The regional data starting point coordinates are then translated to these origin coordinates. Since all other point coordinates are incremental and sequential, this translation need be done only once for a given starting point. Then, for each point including the starting point, the X and Y coordinates are rotated to the vehicle heading in order that the map presented may coincide with the vehicle heading. Since the standard formulas for rotation require the sine and cosine of the rotation angle, a hand-or compass-driven digital resolver may be used to provide these functions.

While the equipment in the preferred embodiments is described in detail hereinafter, two particular characteristics of it merit mention here. First, a microprocessor unit employed for arithmetic manipulations is connected at both input and output, via gates, to a read-only log memory and a read-only antilog memory so that multiplication is effected by reading multiplier and multiplicand through the log memory to provide their logarithms to the microprocessor, which adds them and feeds the result to the antilog memory, which provides their product. Secondly, programs are stored in a plurality of read-only memories (called in totality a program memory) which each contains a macrostep comprised of a series of microsteps, or individual instructions. When a given macrostep is addressed, a counter automatically reads out the successive microsteps. A decision logic unit receives pertinent data from various other units and when such data indicate that a change in program macrostep is needed, it addresses the proper unit of the program memory and thus initiates another program macrostep. It also automatically initiates the routing of the data being processed to its next processing station. There are thus two different data processing control loops, one which deals with the microsteps in the details of addition and subtraction, shifting data, and the like, and another which selects the macrosteps and data routing in a succession which may vary according to the data being processed. There is no fixed program which must be traversed in sequence; with flexibility achieved only at the expense of traversing a number of conditional transfer interrogations.

The general scheme of the mathematical operations is as follows: The coordinates $X_{SP}$ and $Y_{SP}$ of the starting point of a string of incrementally encoded data are translated to the vehicle coordinates $X_V$ and $Y_V$ as an origin and are used to produce the absolute, rather than incremental, coordinates $X_n$ and $Y_n$ of successive points $P_n$ by cumulatively adding the various increments in the string, thus $$X_n = (X_{SP} - X_V) + \sum_{n=o}^{n} \Delta X_n$$

$$Y_n = (Y_{SP} - Y_V) = \sum_{n=o}^{n} \Delta Y_n$$

These are rotated to the vehicle heading by $$X'_n = X_n \cos\psi + Y_n \sin\psi$$

$$Y'_n = -Y_n \cos\psi + X_n \sin\psi$$

where the primes indicate a rotated coordinate.

A majority of the data points will lie outside of the area defined by $\pm X_F$, $\pm Y_F$, and will be irrelevant. The criterion for a point to lie within the frame is:

$$|X'_n| < |X_F| \text{ and } |Y'_n| < |Y_F|$$

but if it fails this test, it cannot be discarded, if $$|X'_{n\pm1}| < |X_F| \text{ and } |Y'_{n\pm1}| < |Y_F|$$

since if the preceding or the following point lies within the frame, the $n^{th}$ point determines a line lying partly within the frame.

These criteria will not prevent the exclusion of a line which passes through the frame between end points which both lie outside the frame; but since data lines are ordinarily short relative to the frame dimensions, most such lines cross the frame only at the corners, where the small error of excluding them is tolerable. If a particular line such as a reference coordinate of the map crosses the entire frame, its exclusion may be avoided by inserting extra points periodically in it in the preparation of the data base. If a vector intersects the frame, that is, if at least one of its end points lines in the frame, the differences $Y'_{n-1} - Y'_n$ and $X'_{n-1} - X'_n$ are computed.

The data base is consistently encoded with a code for the region on the left side and a code for the region on the right side of the vector, referred to its positive direction, which may be at any angle. But the raster line is always implemented, or swept, from left to right and the code indications must be consistent with this. If the direction of the X-component of the vector is opposed to the direction in which the raster lines are formed, the left and right codes of the vector must be interchanged. To determine this, the sign of $Y'_{n-1} - Y'_n$ is first examined; if it is negative, no interchange is required; if it is positive, the left and right codes of the vector are interchanged. If the difference is zero, the vector is parallel to the raster line and no interchange is necessary.

This operation is required for boundary vectors (which are identified by a further code), but not for lines such, for example, as road markings which do not carry left and right codes, but rather a code for their own brightness.

The vector slope $X'_{ns}$ is computed by the equation $$X_{ns} = \frac{X_{n-1} - X_n}{Y_{n-1} - Y_n}$$

A data word consisting of the end point coordinates, codes, and the vector slope times raster spacing is now read into a frame memory (discussed further in the description of the preferred embodiments).

A frame memory containing all the data words pertinent to a given frame contains implicitly all the information needed to present a picture or map; but to be presented through the conventional scanned-raster devices as used in television it must be transformed to a different set of axes, the raster lines. A raster line may be identified by its Y coordinate $Y_R$; and the transformation of the stored data consists in essence of determining the X coordinates at $Y_R$ of the intersecting data lines. This is standard analytic geometrical procedure. However, if a data line is close enough to the horizontal so that its slope $X'_{ns}$ is greater than two, its intersections with successive raster lines $Y_R$ and $Y_{R+1}$ (where $Y_{R+1} = Y_R + \Delta Y_R$) will not present the appearance of a continuous line, but will appear as a dotted line, or a succession of disconnected points. This will obviously be undesirable in a line vector, such as the representation of a road; but even for a boundary vector it will produce a stepped or "staircase" effect in the boundary. A transition vector is therefore generated in the line $Y_R$, by adding additional intersections to a total horizontal length equal to $X'_{nT}=(\Delta Y_R)(X'_{ns})$ which is the equation of the transition vector. This operation effectively "stretches" the original intersection out to the X coordinate at which the data line intersects the next raster line $Y_{R+1}$. These added intersections are provided with a code or flag which is later interpreted to show that the brightness code associated with them and the original intersection to which they have been added takes priority over any conflicting codes which may appear as a result of the presence of other intersections of other data lines with the same points in the raster line. If the transition vector has been added to a boundary line, the same flag is caused to produce an averaging of the right and left-hand tones of the boundary line.

The rotated line end points, the adjusted codes and the transition vectors that are within, or intersect, the map display boundaries are stored in a frame memory. Two frame memories are used. One accepts and stores the data as it is computed from the region data base. The second, which holds the previously computed frame, is read out continuously by a special processor which generates the CRT image. When a new frame of data is computed, the memories are switched.

The special processor reads out the frame memory every raster period. Starting with the display bottom raster line, all line end points are selected which lie on this raster line. The codes are read into a random access memory using $X'_n$ as the address. The raster beginning code, e.g., intensity, and the proper intensity for each following intersection are selected. These are then read out and converted to a continuous raster line analog intensity signal. At the same time, the $X'_n$ distance is updated to the next sweep by $X'_{nt}$ which is the change in $X'_n$ per raster increment. Multiple buffer memories and random access memories are used so that the above operations are continuous.

Any intersection having identical left and right codes is deleted since its presence would not produce a change in the display. Points whose code is a hidden line are also deleted. Hidden lines are inserted where necessary to maintain the contiguous string of vectors. They have no effect on the display.

A second embodiment of the invention uses large digital display memories, which store an intensity level for every element of the display, to replace the high speed special processor. Two memories are used. While one is being read out at TV rates generating the display, the other is being loaded for the next display. In this embodiment, the microprocessor system is programmed to compute the intensity level for each element of the display.

The first embodiment, using the special processor, will generate a map display two to three times faster than the second embodiment, but will require slightly more equipment and will use more power. The preferred embodiment will depend on system requirements.

BRIEF DESCRIPTION OF THE DRAWINGS

FIG. 7 illustrates an implementation of the microprocessor system of FIG. 2.

FIG. 14 illustrates an implementation of an output processor illustrated in FIG. 1.

DESCRIPTION OF THE PREFERRED EMBODIMENTS

Figure 1:
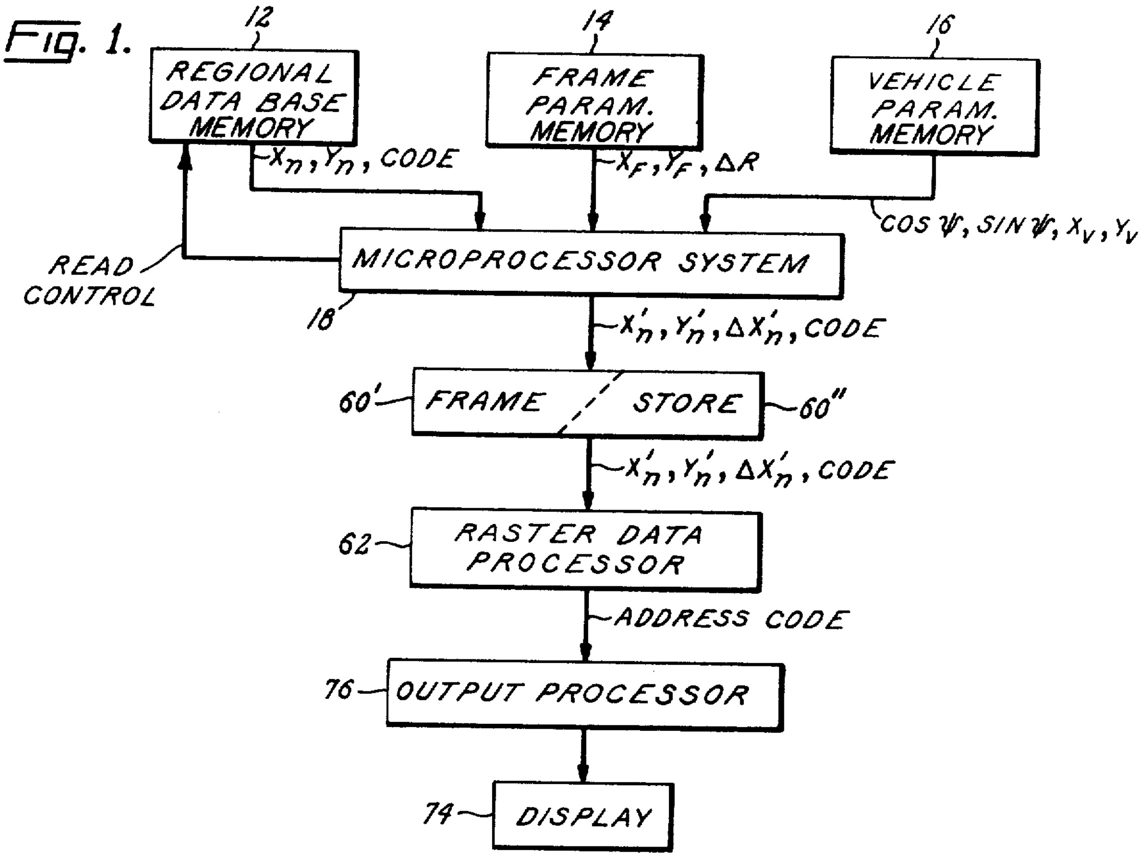
FIG. 1 is a block diagram illustrating one embodiment of the invention.

FIG. 1 represents generally in block diagram form the organization of one embodiment of the invention. Initial data, i.e. data not yet operated on by the microprocessor system, on the entire region are stored in a regional data base memory 12 in incremental form as previously described. A frame parameters memory 14 is a source of the bounds $\pm X_F$ and $\pm Y_F$ of the frame in which the map is to be presented. These may be a measure of the scale of presentation; if a standard television monitor type of display is to be used, the aspect ratio will be fixed at three:four and a single knob may be connected to drive angle/digital encoders reading in this ratio. The spacing $\Delta R$ between raster scan lines will be required for data processing and will be determined by the value of $Y_F$. It may therefore also conveniently be derived from the same shaft rotation. A vehicle parameters memory 16 is a source of digitally encoded sin $\psi$ and cos $\psi$, where $\psi$ is the angular bearing of the vehicle and of $X_V$ and $Y_V$ which are usually the coordinates of the vehicle's best known position in the region. Clearly, the bearing functions may be produced by conversion from the rotation of a compass repeater, or by the rotation of a knob by a human operator. Similarly, the vehicle position may be entered by manual setting of switches; any tie-in with automatic position finding equipment should definitely be subject to manual override for the practical reason that a pilot may wish to look at a map of a region where he has not yet arrived.

The information from the regional data base memory 12 will include the X and Y coordinates of a point P, coded data to indicate the nature of the vector extending from the point (i.e. boundary vector, line vector, starting point) and quantitative data pertinent to such nature, such as the left-hand and right-hand brightnesses for a boundary vector. The coordinates of the next point serve, of course, to mark the end of the first vector as well as the start of the next. This leads to a logical data sequence of coordinates-code-coordinates-code-. . . . While in FIG. 1 data channels are indicated by single lines, it is to be understood that each of these channels comprises multiple data lines. Frame and vehicle parameters change only in response to alterations outside of the system, and hence no memory locations need be addressed to bring them from their stores; they may be furnished continuously by bit flip-flops.

Regional data base memory 12 must be addressed in a specific sequence beginning with the start point coordinates $X_{SP}$, $Y_{SP}$, and so there is a requirement for specific addressing by a counter which may be incorporated in the regional data base memory and stepped by a read signal, or may be incorporated in external data processing equipment.

Figure 2:
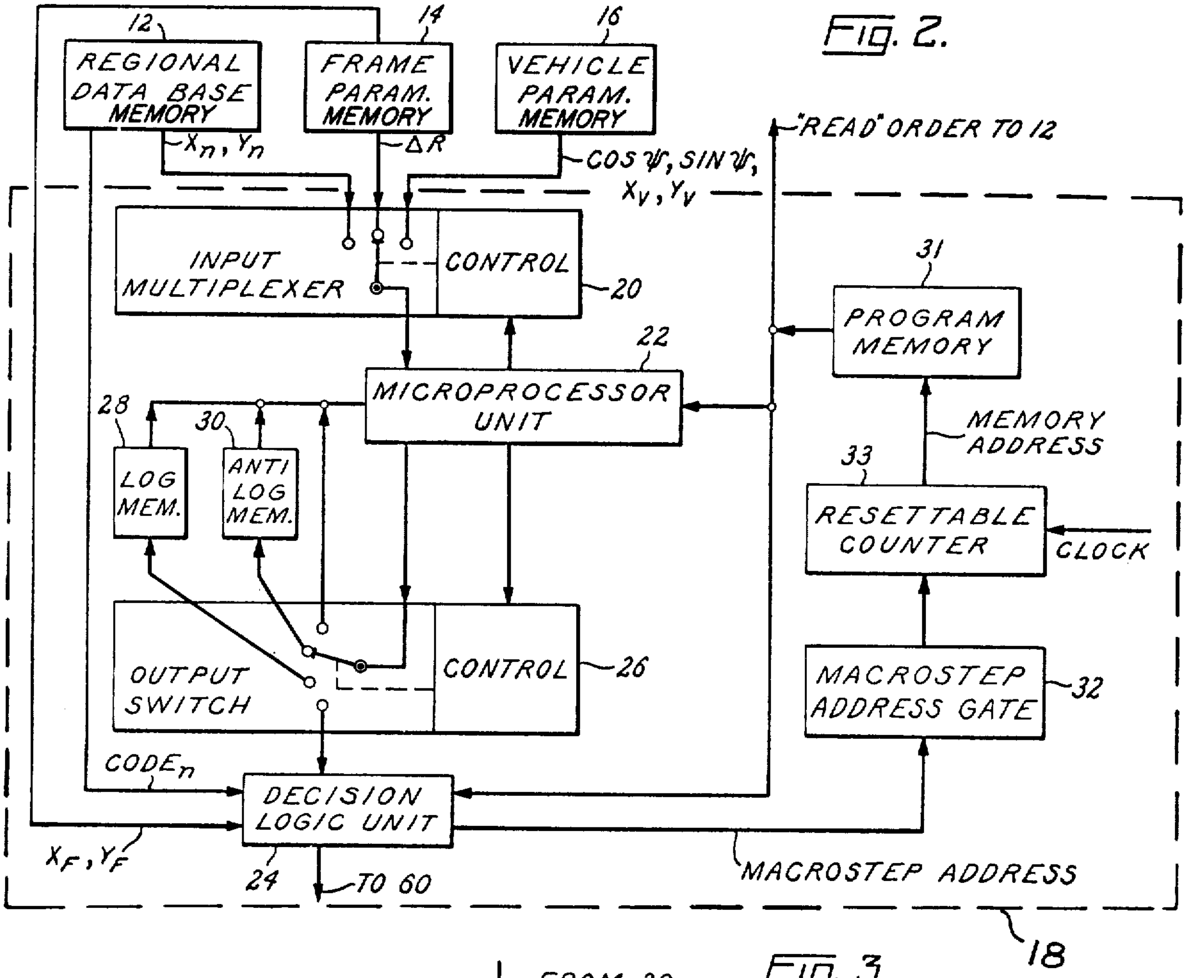
FIG. 2 is a block diagram of a microprocessor system illustrated in FIG. 1.

The recipient of data from these three sources 12, 14, 16 is a microprocessor system represented as block 18 in FIG. 1, and in detail in FIG. 2, to which attention is now invited.

The point coordinates from regional data base memory 12 and the frame and vehicle parameters from memories 14 and 16, respectively, are represented as entering an input multiplexer 20 which, although symbolized as a switch, is merely a set of gates controlled by control signals from a microprocessor unit 22 to admit one of these data to the microprocessor unit. The codes from regional data base memory 12 and the frame boundaries from memory 14 are connected directly as inputs to a decision logic unit 24. The output of microprocessor unit 22 is fed to output switch 26, which preferably comprises a plurality of gates under the control of unit 22, although symbolically represented as a switch. Output switch 26 can feed the output of unit 22 to decision logic unit 24, or to inputs of a log memory 28 or an antilog memory 30, or indeed back to an input of unit 22 again. The outputs of log memory 28 and antilog memory 30 are the functions of their inputs which their titles indicate. Two numbers to be multiplied are fed in succession through the log memory 28, and the resulting logarithms are fed directly into the registers of an arithmetic logic unit in microprocessor unit 22 (shown in detail in FIG. 3), added together, and read out through output switch 26 into antilog memory 30, whose output (the required product) is fed back to appropriate registers in microprocessor unit 22.

The mode of control of the microprocessor system is unconventional. A program memory 31 is organized as a plurality of memories each representing a separately addressable macrostep. Each macrostep constitutes a series of microsteps through which the memory will proceed in response to the successive addresses from a clocked resettable counter 33, after that macrostep has been addressed. East macrostep thus constitutes a microprogram routine, but there is no fixed sequence in which these macrosteps are followed. Decision logic unit 24 receives inputs from a number of sources, and it responds to these by generating appropriate encoded macrostep addresses to which, via a macrostep address gate 32, it can set reset counter 33. Thus, the microprocessor system is capable of executing a number of different routines, any one of which may be selected according to the existing situation. Microprocessor unit 22 receives instructions from program memory 31, and in turn generates control signals to input multiplexer 20 and output switch 26, and performs subsidiary operations in a number of steps in response to a given order from program memory.

Figure 3:
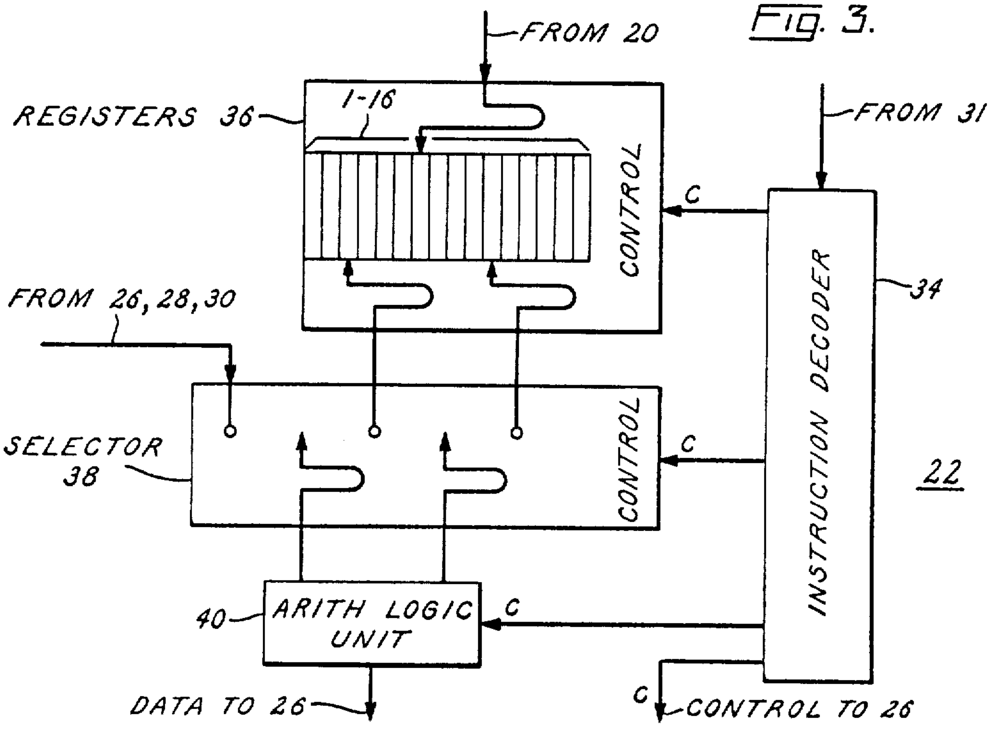
FIG. 3 is a block diagram of a microprocessor unit illustrated in FIG. 2.

FIG. 3 represents the internal organization of microprocessor unit 22 illustrated in FIG. 2. Instructions from program memory 31 to unit 22 enter instruction decoder 34, which converts the multi-digit instructions into control signals transmitted over individual lines C to appropriate controlled devices. These devices include not only components internal to the microprocessor unit 22, but also input multiplexer 20 and output switch 26. Input multiplexer 20 feeds its selected input to one of sixteen registers 26, which can be read out to selector 38, which also has inputs from log and antilog memories 28 and 30, respectively, and from output switch 26. Selector 38 feeds into two inputs to arithmetic logic unit 40 (acronym ALU) since its functions of addition and subtraction require two operands. The output from the ALU is fed to output switch 26. Multiplication by the ALU is accomplished as follows: a multiplicand is fed through output switch 26 to log memory 28, whence its logarithm passes directly through selector 38 to a working register of ALU 40; the multiplier is processed similarly and its logarithm is placed in a second working register. The contents of the registers are summed by the ALU and the sum is passed through output switch 26 to antilog memory 30, whence the product enters selector 38 and thence ALU 40.

Figure 4:
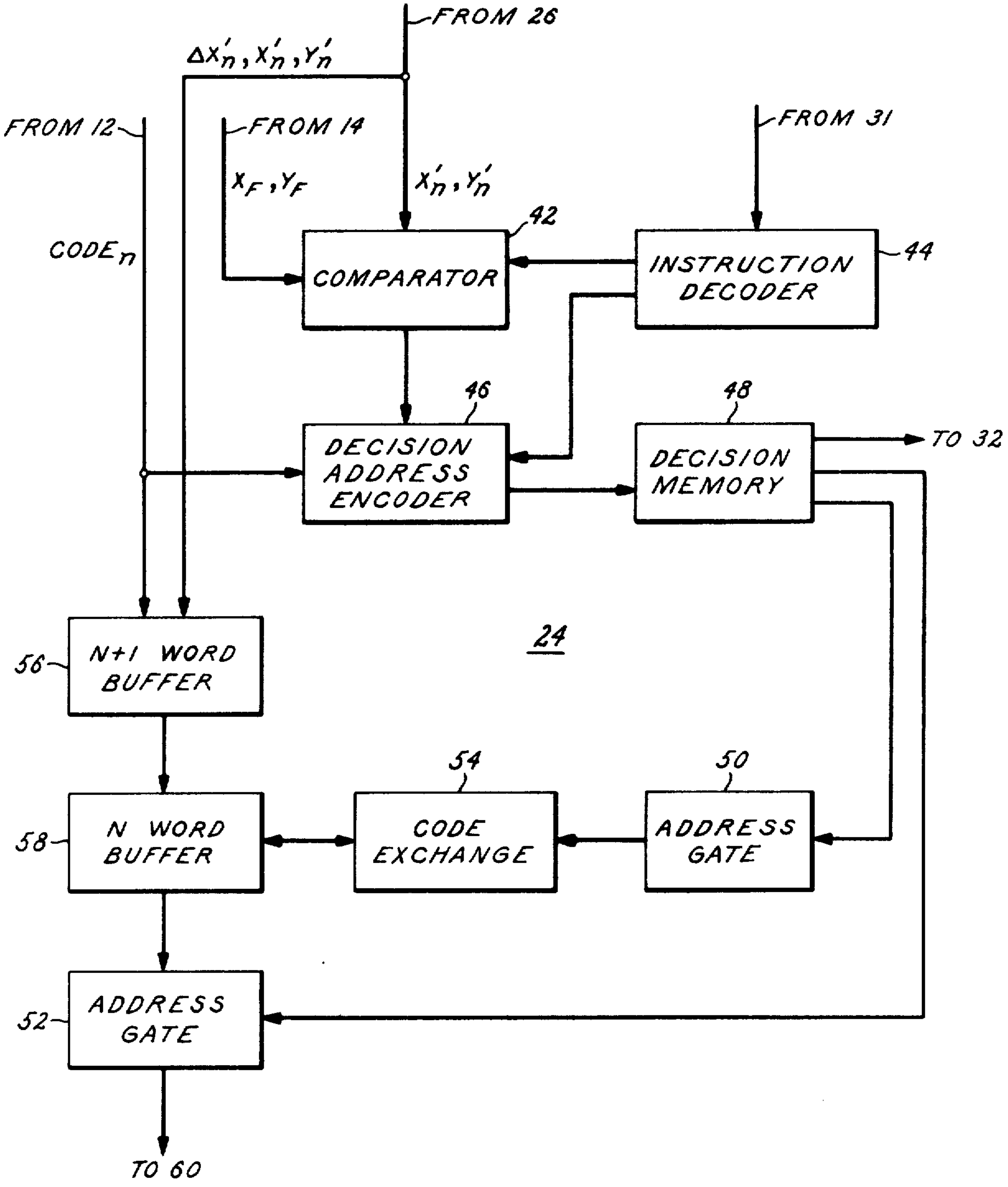
FIG. 4 is a block diagram of a decision logic unit illustrated in FIG. 2.

Decision logic unit 24 is detailed in FIG. 4. Comparator 42 is connected to receive from 14 of FIG. 1 the frame parameters $X_F$ and $Y_F$ as one input, and from output switch 26 the rotated and translated point coordinates $X'_n$ and $Y'_n$ for a determination whether the point coordinates lie within the frame boundaries. The decision logic unit 24 has its own instruction decoder 44 which receives program instructions from program memory 31 and addresses the decoder control signals to comparator 42 and to decision address encoder 46, which also receives the binary output of the comparator 42, and the code associated with the X and Y coordinates of a given word, which may be transmitted directly from regional data base 12, since it is not subject to mathematical manipulation as such.

The decision address encoder 46 is logically a device which interprets the combined significance of all its inputs as representing a particular logical situation and identifies that situation by an encoded output. Technically, it may be a read-only memory having as address inputs terminals for all the digits of the inputs represented in FIG. 4. Each given possible combination of inputs produces an output signal identifying the logical situation which that combination represents. This may be a signal upon a particular single conductor, in which case the encoding consists simply in the identity of the conductor upon which the signal appears; or it may be a binary coded signal appearing upon a plurality of conductors.

Decision memory 48 is also a read-only memory (or, in older terminology of the art, a function table) which receives the output signal of decision address encoder 46 and, responsively thereto, produces output signals, each being an address, which are transmitted to address gates 32, 50 and 52. It is evident that the combination of decision address encoder 46 and decision memory 48 is actually the equivalent of a single read-only memory or function table which produces a given predetermined output signal for a given predetermined combination of input signals. The subdivision shown is preferred because it simplifies the design, permitting separate consideration of the two functions described. The address from 48 differs from a simple gating signal which merely opens a gate to which it is connected; the address according to its encoded content may merely open a selected gate (such as 52) or it may open a gate and transmit its encoded content through the gate, such as 32, which transmits a specific address to reset resettable counter 33 to start a particular macrostep.

At this stage it is appropriate to describe typical data processing procedure. Individual registers of 36 will be identified by number as R1, R2, etc. A portion of the program utilized is illustrated in TABLE 1 of an appendix to this specification.

Reset counter 33 is so designed that in the absence of a specific instruction or address through gate 32 it will "home" to the program step which orders reading out from the regional data base 12 and from frame and vehicle parameters 14 and 16. This might typically be a response to an all-zero instruction. The code associated with the coordinates from data base memory 12 is received by decision logic unit 24; if it does not identify the point as a starting point of a string, the program step is continued so that the next data point is read out. This continues until a starting point is reached. At that time, the decision logic unit 24 sends gate 32 an address for counter 33 for a macrostep which causes the following data to be read into the registers indicated.

R1 $X_V$ (vehicle X coordinate from 16)
R2 $Y_V$ (vehicle Y coordinate from 16)
R3 cos $\psi$ (vehicle heading function from 16)
R4 sin $\psi$ (vehicle heading function from 16)
R5 $\Delta$ R (line spacing in raster)
R6 $X_{SP}$ (start point coordinate from 12)
R7 $Y_{SP}$ (start point coordinate from 12)

At the same time, $X_F$ and $Y_F$, the boundary coordinates of the frame, are each read into a register in comparator 42, where they are held during the reading through the entire content of the data base in memory 12.

A microstep in the major routine now in process is the subtraction of $X_V$ from $X_{SP}$, which the result replaces in R6, and of $Y_V$ from $Y_{SP}$, which the result replaces in R7. These are the starting point coordinates translated to the vehicle coordinate origin. The next microstep reads the next point from data store 12 into R8 and R9. Since these coordinates will be increments, as indicated by their code to decision logic unit 24, the next microstep proceeds as addition of the content of R8 to that of R6, and of R9 to that of R7, giving $X_n$ and $Y_n$, the translated but unrotated coordinates of point $P_n$. By additional successive microsteps, $X_n$ is read through log memory 28 and cos $\psi$ is then read through log memory 28, the resulting logarithms being read back directly to microprocessor unit 22 where they are added; their sum is read through antilog memory 30, giving $X_n$ cos $\psi$, which is stored in R10. $Y_n$ sin $\psi$ is similarly calculated and stored in R11. The contents of R10 and R11 are then added and stored in R12 as $X'_n$, the translated and rotated X coordinate of point $P_n$. Similarly, $-Y_n$ cos $\psi$ and $X_n$ sin $\psi$ are calculated and stored in R10 and R11, respectively, and added to produce $Y'_n$ which is stored in R13.

The next microstep is to shift $X_n$ and $Y_n$ from R8 and R9 to R6 and R7, respectively, and to read in from data base memory 12 the next set of coordinates (incremental) into R8 and R9. These increments are added to $X_n$ and $Y_n$, giving $X_{n+1}$ and $Y_{n+1}$, which are stored in R8 and R9. The rotation of these is accomplished as described for the previous point $P_n$ giving $X'_{n+1}$ and $Y'_{N+1}$, which are stored respectively, in R14 and R15. At this time there are on hand $X'_n$, $Y'_n$ and $X'_{n+1}$, $Y'_{n+1}$ with no information whether both of these points lie outside of the frame, or whether at least one of the points lies within it. Output switch 26 first reads the content of R12 and R13 to comparator 42, which already has stored $X_F$ and $Y_F$. By omitting the sign bit of $X'_n$, it determines whether its absolute value is less than $X_F$, and similarly for $Y'_n$ with respect to $Y_F$. The contents of R14 and R15 are then read to comparator 42, and similar determination is made for them. If $X'_n$ is less than $X_F$ and $Y'_n$ is less than $Y_F$, or if $X'_{n+1}$ is less than $X_F$ and $Y'_{n+1}$ is less than $Y_F$, at least one point of the pair $X'_n$, $Y'_n$, $X'_{n+1}$, $Y'_{n+1}$ lies in the frame and hence defines a line lying at least partly within the frame. If this condition is not satisfied, neither point lies within the frame, and the line they define (even though it may cross the frame) will be ignored, for reasons previously given. Decision address encoder 46 receives the comparator 42 determination, together with decoded instructions from decoder 44, and feeds its encoded finding to decision memory 48, which, via gate 32, addresses reset counter 33 to cause program memory 31 to initiate an appropriate program macrostep. If both points $X'_n$, $Y'_n$ and $X'_{n+1}$, $Y'_{n+1}$ have been found to lie outside of the frame, $X'_n$ and $Y'_n$ are discarded, being replaced in R12 and R13 by the contents of R14 and R15, respectively. The next data point incremental coordinates and associated code are read from data base memory 12, the $X_{n+2}$ and $Y_{n+2}$ increments being entered into R8 and R9, whose previous content is shifted to R6 and R7, and the procedure described for points $X_n$, $Y_n$; $X_{n+1}$, $Y_{n+1}$ is repeated for points $X_{n+1}$, $Y_{n+1}$; $X_{n+2}$, $Y_{n+2}$.

If, however, at least one of points $X'_n$, $Y'_n$; $X'_{n+1}$, $Y'_{n+1}$ lies within the frame, a different program step is initiated. $Y'_{n+1}-Y'_n$ is calculated and sent to comparator 42 to determine if it is different from zero. If it is not different (i.e., if it is zero) this indicates that the line between the points is parallel to the raster lines. Th processing is complete for this point. Decision logic unit 24 then causes $X'_n$ and $Y'_n$ to move to buffer 56. The contents of buffer 56 are shifted to buffer 58 and the contents of buffer 58 are shifted to the frame memory 60. At the same time, instructions are sent to the macrostep address gate 32 initiating the program step for read in of the next word from regional data base memory 12.

If $Y'_{n+1}-Y'_n$ is negative (showing that the direction of the line from n to n+1 is negative with respect to the scan direction of the raster lines), the left-hand and right-hand brightness or similar codes of the line are interchanged so that they may be consistent with the scan convention. The details of this require consideration of FIG. 4, where there appear in cascade N+1 word buffer 56 and N word buffer 58, which receive the data code directly from data base memory 12, and $X'_n$, $Y'_n$ and $\Delta$ $X''_n$ (yet to be defined). The two buffers in cascade merely provide delays for proper timing with respect to other time-consuming operations such as those now being described. The inputs to decision address encoder 46 cause it to address decision memory 48. In response, address gate 50 causes code exchange unit 54 to exchange the order of the left and right-hand coding of the word in buffer 58. This is obviously a simple matter of cross-reading and writing the contents of two parts of the memory.

The next series of micro program steps calculate the change in $X'_n$ per raster increment, ΔR. This is $$\Delta X''_n = \Delta R\,\frac{X_{n+1} - X_n}{Y_{n+1} - Y_n} = X_{nt}$$

The calculations are now complete and $X'_n$, $Y'_n$ and $\Delta X''_n$ are transferred to buffer 56 and then to 58 and the word in buffer 58 is sent to frame store 60. The next word in region data base memory 12 is read in and the processing is repeated.

The processing of frame store 60 data, which is described in detail later, is based on updating the data line end points each raster line. The processing starts with the bottom raster line and increments upward. The map display information will not start until the first raster line intersecting with a data base point above the bottom line unless intersections of the lines that cross the initial raster line are calculated. A line crosses the initial raster if $Y'_n$ is greater than $-Y_F$ and $Y'_{n+1}$ is less than $-Y_F$, or vice versa. When this condition is detected by decision logic unit 24, a specific macrostep program, stored in program memory 31, is initiated by command from the decision logic unit 24 via address gate 32 and reset counter 33.

The first microsteps of this program are the same as described previously, e.g. the codes are ordered relative to a left to right raster sweep and the change in $X'_n$ per raster increment is computed. The following micro program steps implement the equation:

$$X'o_n = X_n + Y_n \frac{X_{n+1} - X_n}{Y_{n+1} - Y_n}$$

$X'^o_n$ then replaces the $X'_n$ that is associated with the $Y'_n$ that was greater in magnitude than $Y_F$. This data base word is in either N+1 word buffer 56 or N word buffer 58. The correct buffer was selected and flagged in the previous operation which detected the line and bottom raster intersection.

The decision logic unit detects the completion of a processing step by an end of program code that is encoded with each macrostep and automatically transfers the data to the next processsing station and causes the next macrostep to be initiated. In the foregoing operation, the data word is transferred to frame store 60 and the next processing step is to read the next word in regional data base 12.

The data entering frame store 60 is the totality of the end point coordinates, the slope, and the associated codes of every line having at least one end point in the frame. It is much less than the total number of intersections with raster lines because it does not explicitly include the intersections with raster lines which lie between data line end points. The content of frame store 60 must be processed further. To permit this while data are also being entered into frame store 60, it is divided into two alternating units 60' and 60" which alternate out of phase with each other, from being filled with data to being read out, an operation known in the art by the esoteric term "ping-ponging".

Figure 5:
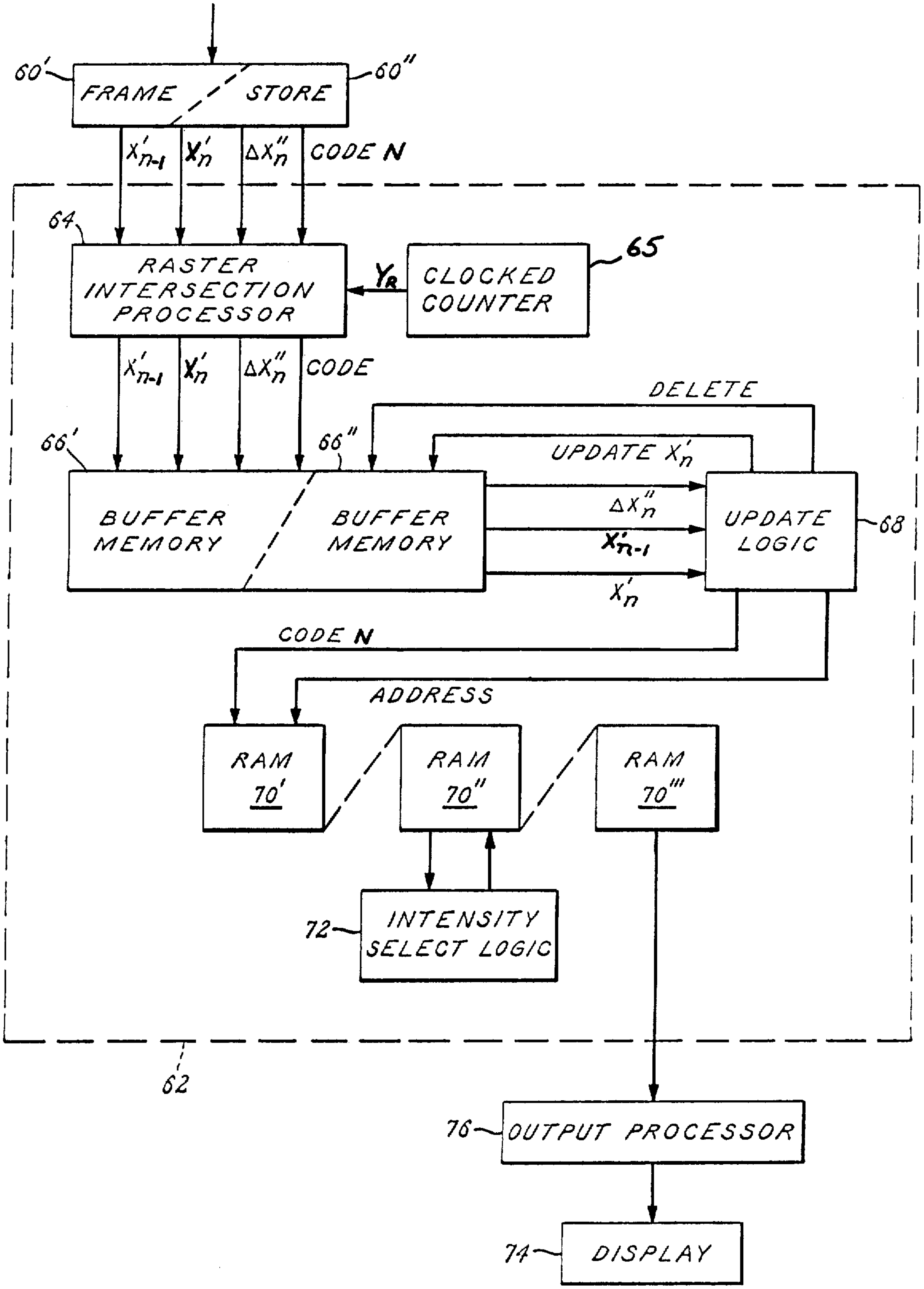
FIG. 5 is a block diagram of a raster data processor illustrated in FIG. 1.

Referring to FIG. 5, raster data processor 62 comprises a raster intersection processor 64 which, in addition to receiving data from frame store 60, receives successive values of $Y_R$ beginning with the initial value at a bottom edge of the frame. These successive values may be provided by a clocked counter 65. For each value of $Y_R$, the points having $Y'_n = Y_R$ are read out from frame store. The transition vector is also generated. The start of the transition vector is $X'_n$ and the end is $X'_n + \Delta X''_n$. The sign of $\Delta X''_n$ may be positive or negative. If the selected $n^{th}$ word is a boundary vector, the code, which is the intensity of the transition vector, is the average between right and left-hand codes. If it is a line vector, the code of the transition vector is the same as the coded line intensity. The x coordinate and code of both the transition vector and the $n^{th}$ word are transferred to ping-ponged buffer memories 66. The transition vector will also be applied to update the $X'_n$ intersection. Up-date error will be accumulative, therefore $\Delta X''_n$ requires a greater accuracy than final display resolution.

After data has thus been written into the buffer memory 66', the memory is switched into position 66" where it is connected with upate logic 68. This is another dedicated data processor which reads out of 66" the stored values of $X'_n$ and $\Delta X''_n$ (the increment in $X'_n$ per increment $\Delta R$) and adds that increment to the previously stored value of $X'_n$ to update it to $X'_{n+1}$, which is then read back to buffer memory 66" as the intersection value for $Y'_{n+1}$. Since this procedure alone would continue a line indefinitely, update logic 68 also tests to determine if a line has completed processing, which is indicated by the relation:

$$X'_n = X'_{n-1} + \Delta X''_n$$

where $X'_n$ is always the end of a line. If these conditions are found, the word is deleted by not reading it back into memory.

While the buffer memory 66" is being read out to update logic 68 and being updated by it, the updated data are also written into one of three random access memories (RAM).

The three RAMs 70', 70", and 70''' are interchanged cyclically in operation. The intersection distance $X'_n$ is used as an address, and the intensity code or codes (since there may be multiple codes e.g. if data lines intersect) are entered. This then gives intensity codes arranged in order of increasing range to intersection. The operation of converting these codes into coded representations of analog intensities is performed by intensity select logic 72 which is cyclically connected to each of the three RAMs. (The cyclical order is 70', 70", 70'''.)

Locations at successively increasing ranges in RAM 70" are addressed by a stepped counter which may be included in it. The first code, for zero $X'_n$, will be that associated with the left side of the minimum $X'_n$. This will be decoded into a digital equivalent of the analog brightness it represents, and rewritten into the RAM 70" at zero range. Whenever a single code is found at an intersection, the same procedure will occur. However, if a number of codes appear at an intersection and one of these carries a priority indication, (e.g. a transition vector or line vector has priority), it will be rewritten into RAM 70" at its range. If there are several non-priority codes, as may occur at a point which is an intersection of several lines, voting logic is used, that is, the majority codes is adopted; in case of a tie the previous brightness is retained.

After the data in memory 70" has been read and modified as described, the memory is switched to position 70'''. At this point in the process, memory 70''' contains the brightness codes for all the intersections in one raster line, arranged in order of increasing distance along the raster line. The internal stepped counter previously mentioned in connection with memory 70", may be used to address memory 70''' synchronously with the horizontal sweep of a CRT display 74; the coded output of memory 70''' is utilized as a digital control signal for output processor 76, which is simply a memory which holds one code until the next appears and a digital/analogue converter whose analogue output controls the brightness of the beam of display 74. This is a great simplification of the display process, which is possible because the various processing units are dedicated to individual functions and so are fast enough to generate a line of data at the rate at which it must be presented on the raster, i.e. above the flicker threshold.

An alternate embodiment will now be described in which the raster processor 62 is eliminated and its functions performed on a time-sharing basis by the microprocessor system. The general arrangement of the components of the alternate embodiment appear in FIG. 6.

Figure 6:
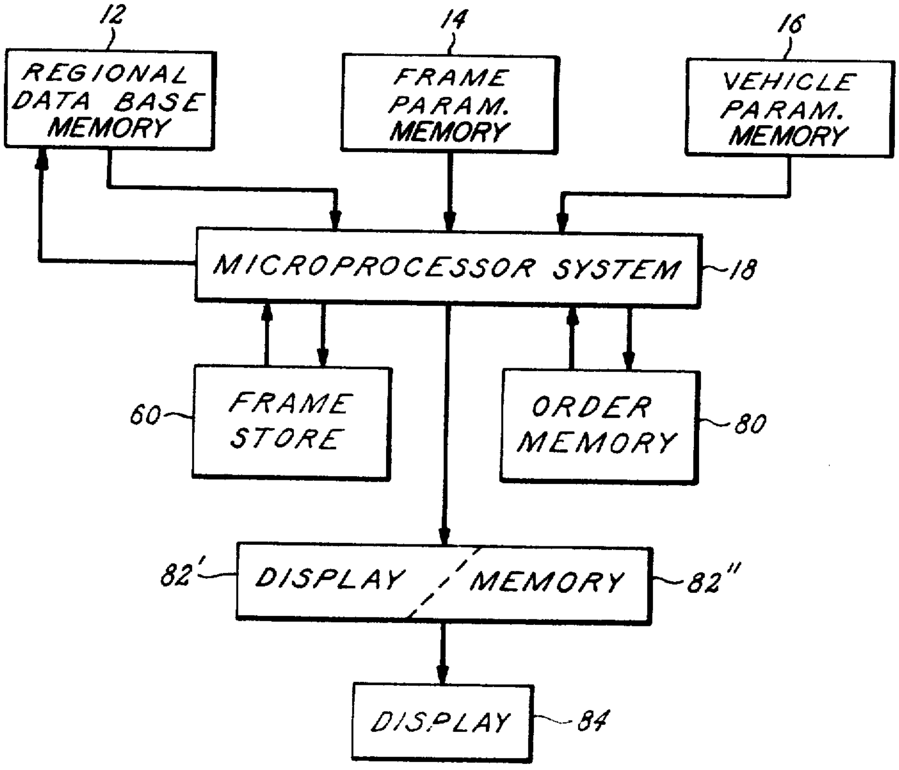
FIG. 6 is a block diagram illustrating a second embodiment of the invention.

In FIG. 6, regional data base memory 12, frame parameters memory 14, and vehicle parameters memory 16 are connected to microprocessor system 18 as in FIG. 1.

The microprocessor system, however, is connected to two separate memories, a frame store memory 60 and a random access order memory 80. The alternate embodiment also includes a display memory 82 connected to receive data from the microprocessor system and a display 84. The microprocessor system 18 converts the regional data to frame data as in the first embodiment and stores the results in the frame store memory 60. However, the microprocessor system 18 then reads the frame store data base content, selects the line end points that intersect the raster line and writes them into the order memory 80 using the distance along the raster line as the address. Microprocessor system 18 then reads the end point data in memory 80 in the order of increasing the distance of the end points represented thereby along the raster line, selects the correct intensity codes in accordance with the criteria given for the first embodiment and writes the intensity code for each picture element (that is, raster line element) into one section 82' of the display memory. The display memory 82 is a ping-ponged memory having two sections 82' and 82", which alternate in being written and read out. Each section of 82 has capacity for storing to a sufficient accuracy (e.g. three bits), for each picture element of the presentation, a code representing the brightness of each picture element in an entire frame. Thus, for a conventional television picture of 512 lines and resolution of 512 elements in each line, its capacity must be $512 \times 512 \times 3$ bits. Memory 82 is commonly termed a scan converter or a CRT refresh memory. The design should permit nondestructive readout, so that memory section 82" may be read out repeatedly at frequencies above the flicker threshold frequency while section 82' is being filled with the next set of image data at much slower rate. Display 84 is assumed to include means to address successive locations in section 82" according to its own scan pattern and frequencies, and to include a digital/analog converter to convert the digital data from 82" to analog brightness signals.

The state of the computer art is now such that the embodiment of given logical functions is routine. A tutorial article "Introduction to LSI Microprocessor Developments", pp 34–46 of Computer, Vol. 9 No. 6, June 1976, published by the IEEE Computer Society, 5855 Naples Plaza, Suite 301, Long Beach, California 90803, describes numerous integrated circuit modules available commercially from a number of suppliers, to perform various logical functions according to the user's desire without requiring him to do more than provide the logic. In the existing state of the art, computers are known which have the ability to take general logical requirements and derive therefrom detailed logic. Implementation of the invention disclosed herein lends itself to the use of this ability. For the sake of completeness, however, specific circuitry that may be utilized to implement the invention, in one form thereof, is illustrated in FIGS. 7 through 14. Each of these figures includes a plurality of boxes representing specific components of the implementation. Inside each box is listed either a part number or another figure number. Unless otherwise noted, the part numbers represent specific Texas Instruments devices that may be utilized for that component. A figure number in a box indicates that the component represented thereby is illustrated in greater detail in the respective figure.

Unless otherwise noted, tri-state devices are used throughout the implementation. This type of logic includes a chip enable input which may be utilized to control gating of data and control signals to the logic implemented thereby. Thus, some of the gating circuitry previously described is replaced by this inherent capability of the tri-state devices.

FIG. 7 illustrates an exemplary implementation of the microprocessor system of FIG. 2. The microprocessor unit is the Advanced Micro Devices AM2901. Table 2 in the Appendix is the software program for this device corresponding to the program steps given in Table 1. With the exception of the gates described in the input multiplexer 20 and of the output switch control 26, each component of the microprocessor system is illustrated in FIG. 7. These gates and the output switch are replaced by the inherent chip enable capability of input multiplexer 20 and in decision logic unit 24 and in memories 28 and 30. Enable signals utilized to control the transfer of data by the various components are generated by the decision logic unit 24 and are designated D1 through D10. The specific enable signals utilized to control the individual components are indicated by short arrowheaded lines signifying inputs to the components and labelled with the specific enable signal designations. These enable signals are generated by the decision logic unit in response to data received over a bus line from program memory 31. This is more clearly illustrated in FIG. 8.

Figure 8:
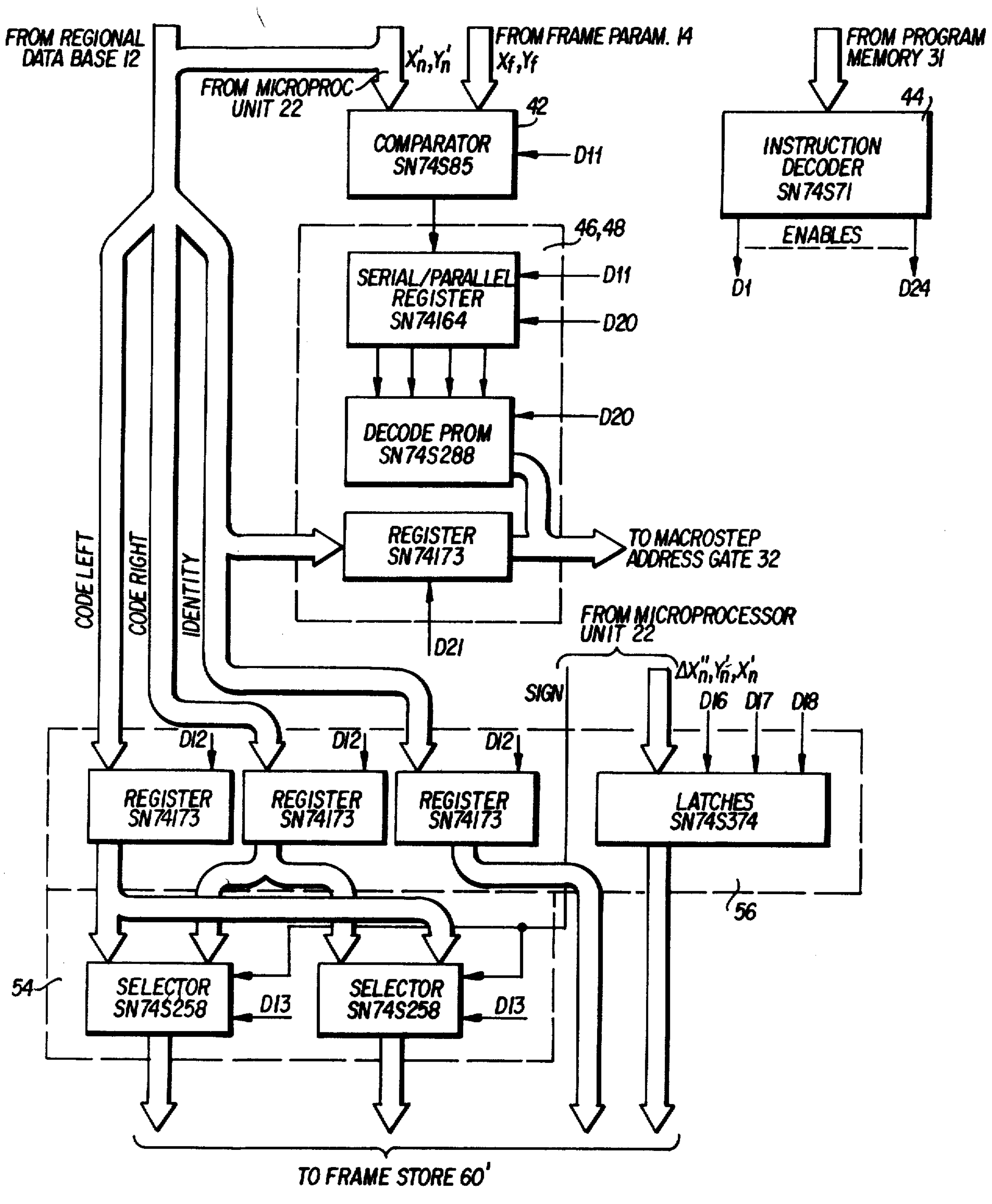
FIG. 8 illustrates an implementation of the decision logic unit of FIG. 4.

FIG. 8 illustrates an implementation of the decision logic unit of FIG. 4. The enable signals are generated by the instruction decoder 44 in response to instructions received from program memory 31. The instruction decoder is a programmable read-only memory which utilizes the instructions as addresses at which are stored codes effecting outputs of predetermined enable signals. Specific enable signals generated during the microsteps specified in Table 1 are listed in Table 3 of the Appendix. The enable signals are also utilized to control the flow of data between devices within the decision logic unit by applying these signals to the chip enable inputs of the devices as indicated by the short arrowheaded lines.

Although there appear to be some dissimilarities between the embodiment of the decision logic unit illustrated in FIG. 4 and the implementation in FIG. 8, the two are functionally equivalent. For example, the decision address encoder 46 and the decision memory 48 are illustrated as two separate elements in FIG. 4 while in FIG. 8 they have been illustrated as one combined element 46/48 comprising three logical devices. By comparison, however, it is evident that substantially the same inputs and outputs exist and that the three logic devices perform the functions previously described for the embodiment of FIG. 4. The two output signals from decision memory 48 to gates 50 and 52 have been eliminated, since these gates are no longer necessary and have been replaced by the chip enable inputs on code exchange register 54 and buffer register 56. It should also be noted that buffer 58 has been eliminated since the delay it performed is now provided by proper timing of the enable signals from the instruction decoder 44.

Figure 9:
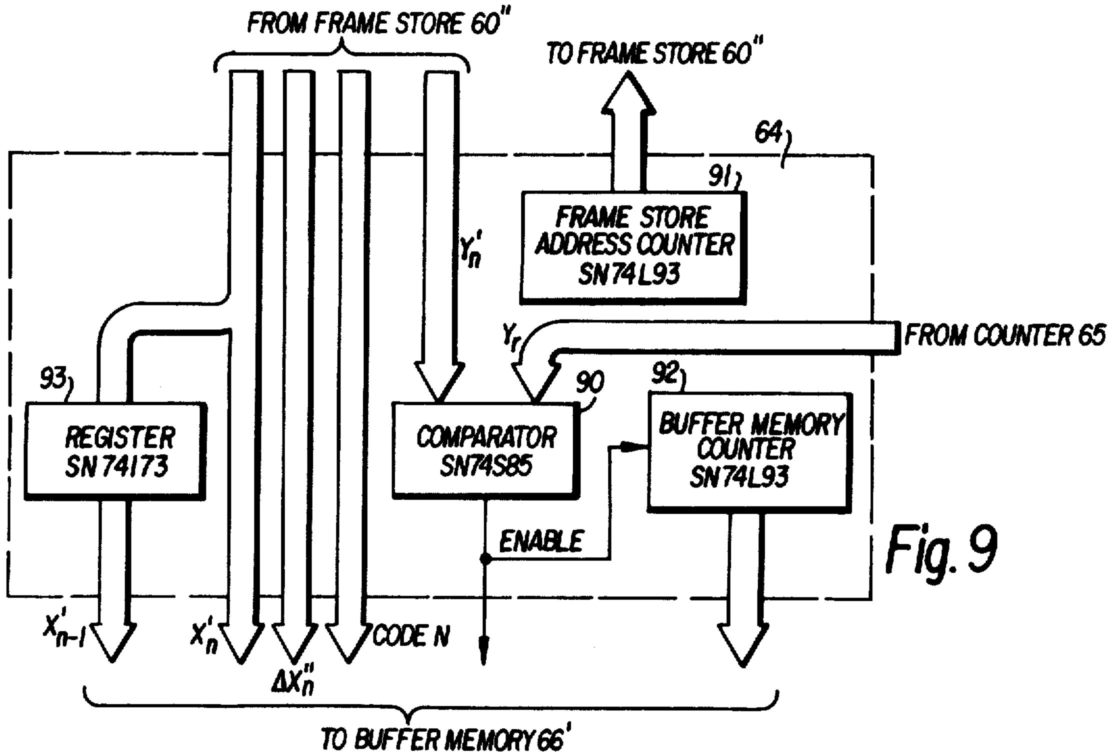
FIG. 9 illustrates an implementation of a raster intersection processor included in the raster data processor.

FIG. 9 illustrates an implementation of the raster intersection processor 64. This processor includes a comparator 90, a frame store address counter 91 and a buffer memory counter 92. Each time the clocked counter 65 is incremented to a new value of $Y_R$, the frame store address counter steps through every address in the frame store memory causing each $Y'_n$ stored in these addresses to be read into the raster intersection processor. The comparator receives $Y'_n$ from frame store and receives $Y_R$ from counter 65 and on comparison transmits an enable signal to buffer memory 66' causing data to be transferred from the frame store address currently specified by counter 91 to the buffer memory. The enable signal is also utilized to update counter 92 each time a comparison occurs. This counter provides continually updated addresses for storage of the data in the buffer memory 66'. A register 93 is provided to hold the previous X' and thus produce $X'_{n-1}$.

Figure 10:
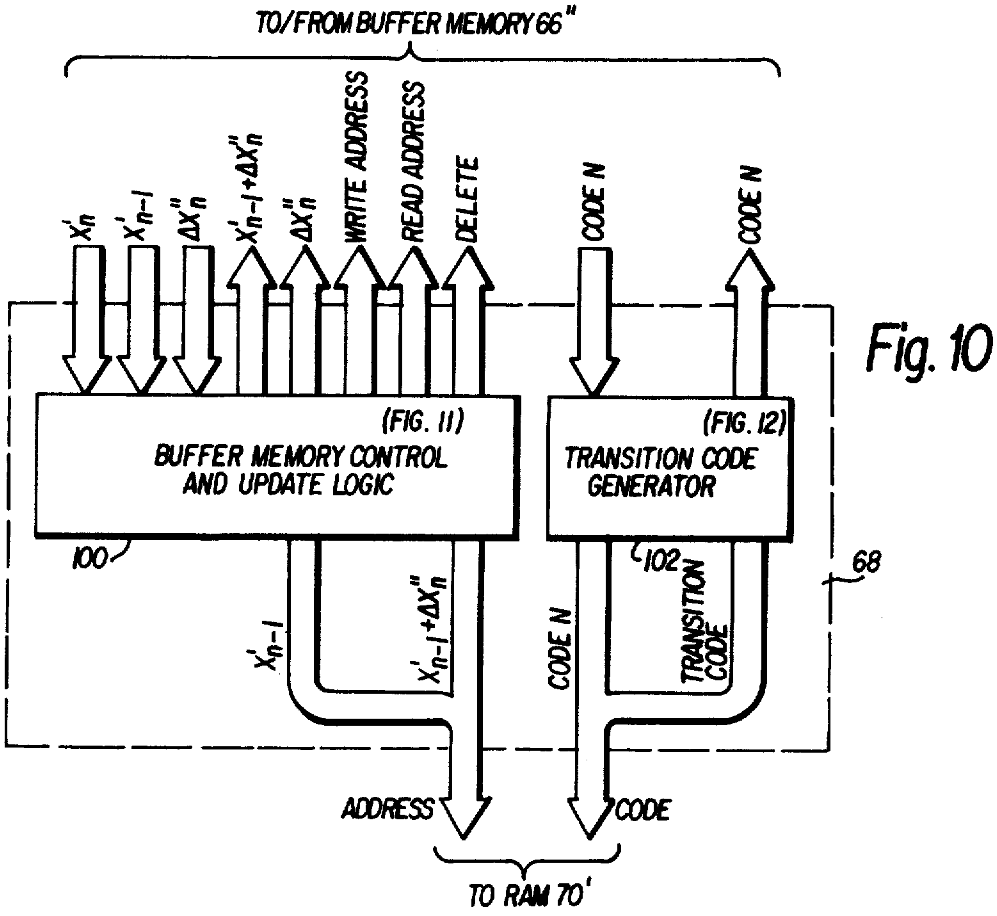
FIG. 10 illustrates an implementation of update logic included in the raster data processor.
Figure 11:
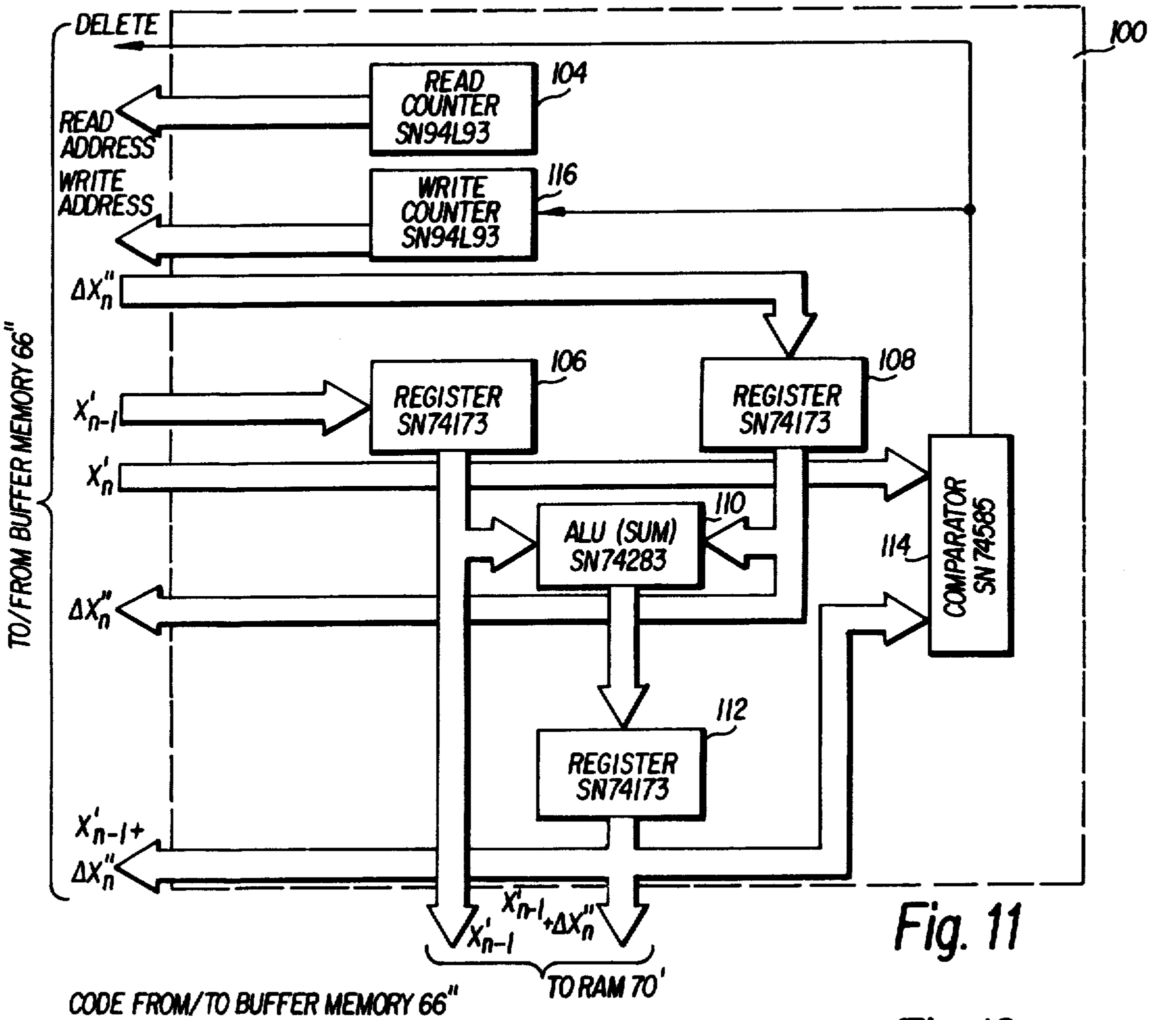
FIG. 11 illustrates an implementation of buffer memory control and update logic included in the update logic.

The update logic 68 is implemented as illustrated in FIG. 10 and includes buffer memory control and update logic 100 and transition code generator 102. The control and update logic, illustrated in detail in FIG. 11, reads stored values of $X'_{n-1}$ and $\Delta X''_n$ from an address $A_{n-}$ in buffer memory 66" under the control of a read counter 104, into registers 106 and 108, respectively. These values are added by an arithmetic logic unit 110 to form the sum $X'_{n-1}+\Delta X''_n$ which is placed in a register 112. The read counter is then incremented to address $A_n$ from which the value of $X'_n$ is read and this value is compared by a comparator 114 with the value stored in register 112. If the two compared values are equal, such that $X'_n=X'_{n-1}+\Delta X''_n$ the comparator generates a DELETE signal which is transmitted to buffer memory 66" to prevent writing the updated value in register 112 into the memory.

As previously mentioned, the buffer memory addresses from which the values for $X'_n$ and $X'_{n-1}$ are read are specified by read counter 104. This is a clocked counter which is incremented one count for each read operation. The buffer memory addresses at which new values from register 112 are written are specified by a WRITE counter 116. This is also a clocked counter which is incremented each time the read counter is incremented if no DELETE signal is present. Each time the comparator generates a DELETE signal, however, indicating that processing is complete for a particular line segment, the WRITE counter is inhibited from incrementing and the address stored therein is saved. Meanwhile, the read counter continues to increment causing reading of data from successive buffer memory addresses until the first value for the next line is placed in register 112. This causes the comparator 114 to cease generating the DELETE signal and the WRITE counter will again begin incrementing synchronously with the read counter once the new value has been written into the saved address.

The control and update logic 100 also utilizes the X-coordinate intersections $X'_{n-1}$ and $X'_{n-1}+\Delta X''_n$ to provide addressing information for writing intensity codes into RAM 70'. This information is utilized to properly locate codes provided by the transition code generator 102 within the RAM.

Figure 12:
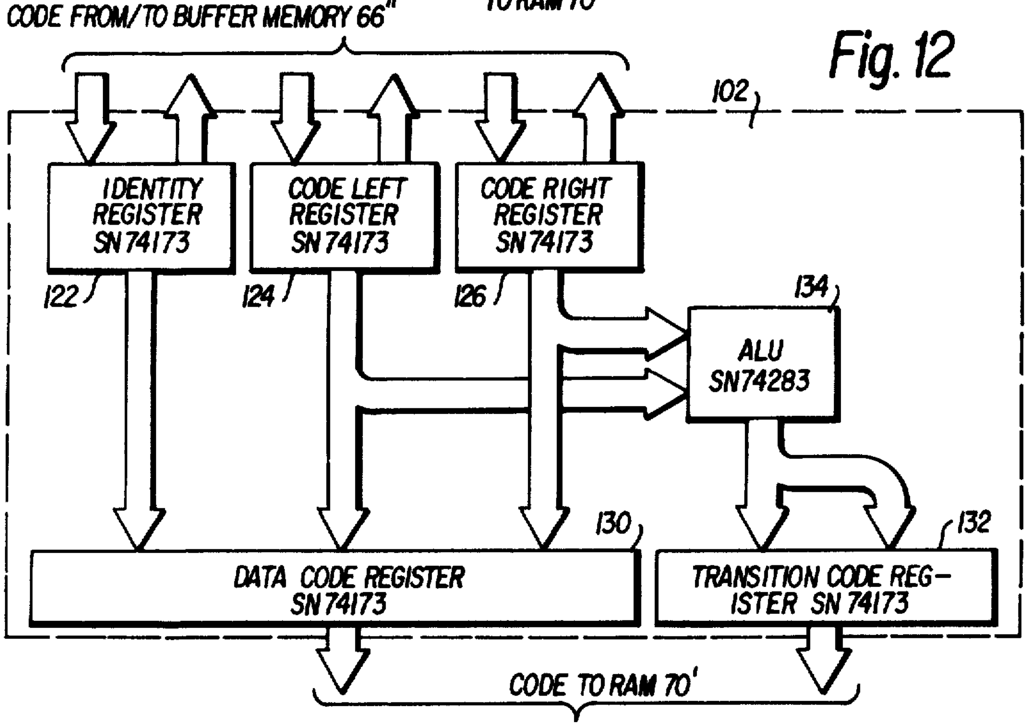
FIG. 12 illustrates an implementation of a transition code generator included in the update logic.

An implementation of the transition code generator is illustrated in FIG. 12. This generator performs the dual functions of transferring the updated data from buffer memory 66" to RAM 70' and of generating transition codes. As each updated code word is placed in a buffer memory address, it is also read into the code generator, with different portions of the word being placed in three registers 122, 124 and 126. Register 122 holds an identity portion of the code word which describes the type of code word (line vector, boundary vector). Register 124 holds a code left portion and register 126 holds a code right portion of the word. If the word describes a boundary vector, the code left and code right portions represent the intensities of the $Y_R$ raster to the left and right, respectively, of the vector intersection. If the word describes a line vector, both left and right portions are identical and represent the intensity of the line.

The entire code word is immediately transferred from registers 122, 124, 126 into a data code register 130 and also back to the address in buffer memory 66" from which it was read. Register 130 holds the code word while an arithmetic logic unit 134 averages the code left and code right portions held in registers 124 and 126 and produces a code representative of the transition vecotr intensity for the code word. This average is formed by summing the numbers in registers 124 and 126, and shifting the result one bit to the right. The code produced by the ALU is placed in a transition code register 132 as both the code left and code right portion of the transition code word. The identity portion of the transition code in register 132 is preset to the appropriate code for a transition vector.

Subsequent to formation of the transition code in register 132, the contents of this register are transferred to address $X'_{n-1}$ in RAM 70' as specified by the control and update logic. Following this transfer the code word contained in register 130 is transferred to RAM 70' address $X'_{n-1}+\Delta X''_n$. If $\Delta X''_n$ is 0, indicating that no transition vector is needed for this intersection, the code in register 130 will be written into the same address as the transition code had been written and the unneeded transition code will be replaced thereby.

Figure 13:
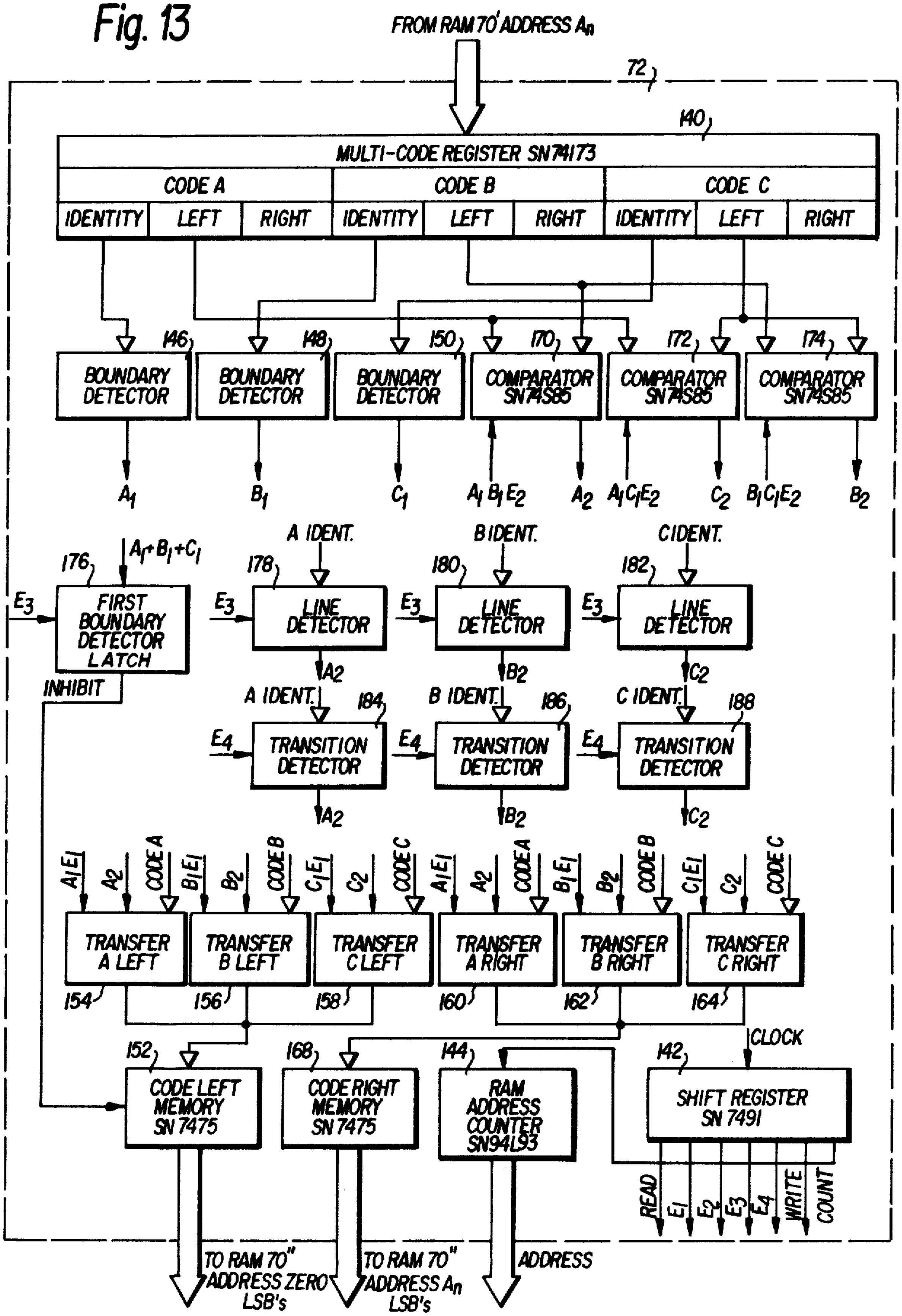
FIG. 13 illustrates an implementation of intensity select logic included in the raster data processor.

Implementation of the intensity select logic 72 is illustrated in FIG. 13. While updated data words are being written into RAM 70', the intensity select logic sequentially reads the code words from every address in RAM 70". These code words were previously entered into RAM 70" by the update logic and in this particular implementation each address has sufficient capacity to contain three code words designated CODE A, CODE B and CODE C.

The code words from each memory address are read into a multi-code register 140 and then intensity select logic performs a sequence of operations to determine which of the codes is of highest priority. The timing of these operations is effected by the usage of a sequence of enable pulses sequentially generated by a shift register 142 at a rate determined by a clock signal applied thereto. The first enable signal generated is a READ enable which effects transfer of the code words from a RAM address specified by a RAM address counter 144 to the multicode register 140. As soon as the code words are transferred to register 140, three boundary detectors 146, 148 and 150 read identity CODES A, B, and C, respectively, and each of these detectors generates an enable signal designated $A_1$, $B_1$, $C_1$, respectively, if the identity code read thereby identifies a boundary line. If an INHIBIT signal (discussed infra) is not present, the identity and code left portions of any such detected boundary code is transferred to a code left memory 152 through one of three transfer gates designated 154, 156, 158. This transfer is enabled by the enable signal generated by the corresponding boundary detector ($A_1$, $B_1$, $C_1$) AND the $E_1$ enable. For example, if CODE A is a boundary code, transfer gate 154 will be enabled by the $A_1E_1$ enable and the identity and left portions of CODE A will be transferred therethrough to the code left memory.

Simultaneous with transfer of the portions of the detected boundary code to code left memory 152, the identity and code right portions are transferred through one of three transfer gates 160, 162, 164 to a code right memory 168 enabled by the same enable signal. If more than one boundary code is present in the multi-code register 140, all will be read into the memories 152, 168 simultaneously. If these codes are not all identical, the data in these memories will be meaningless, but this will be corrected during the next sequential operation.

The next operation is initiated by the $E_2$ signal which enables three comparators 170, 172, 174 to compare the left portions of multiple boundary codes for equality. If more than one boundary code exists for a particular intersection along the raster line, at least two will have codes representing equal rastor intensities on either the left or the right side thereof. Arbitrarily, the left side is chosen for comparison, with each of the comparators functioning to compare the left side code intensities for one of the three possible combinations of boundary line pairs. If CODE A and CODE B are identified by detectors 146, 148, as boundary line codes, comparator 170 is enabled by the signal $A_1B_1E_2$. If the left portions of CODE A and CODE B are equal, the comparator 170 generates an $A_2$ enable signal. If no INHIBIT is present, the $A_2$ enable effects transfer of the identity and left and right portions of CODE A through transfer gate 154 to memory 152. The identity and code right portions are transferred to memory 168 unconditionally. These code portions are thus written into these memories in place of any previous data contained therein. If equality of the multiple boundary codes is not found by comparator 170, it will be found by either comparator 172 which compares the left portions of CODE A and CODE C or by comparator 174 which compares the left portions of CODE B and CODE C and the appropriate one of these comparators will generate either a $C_2$ or a $B_2$ enable signal effecting transfer of either CODE C or CODE D, respectively, into the memories as was described for comparator 170.

The code left portion of the first boundary code detected, as sequential memory addresses from RAM 70" are read, defines the starting intensity of the raster line as it begins its sweep across the display. This portion of the first boundary code will be placed in memory 152 during either the operations initiated by enable $E_1$ or $E_2$ and it is desirable that the contents of this memory remain undisturbed during the remainder of the operations performed on the data in RAM 70". Therefore, on the occurrence of enable signal $E_3$ a first boundary detector latch 176 is set, if any one of the enable signals $A_1$ OR $B_1$ OR $C_1$ indicate the presence of a boundary code in register 140. When set, this latch generates an INHIBIT signal which prevents further data entry into memory 152.

Enable signal $E_3$ also initiates detection of the next higher priority code in register 10. If CODE A, CODE B or CODE C identifies a line vector one of three line detectors 178, 180, 182 will generate a corresponding $A_2$, $B_2$, $C_2$ enable signal effecting transfer of the identity and code right portions of this line vector code into memory 168. A detected line code thus takes the place of any boundary code entered in this memory during the $E_1$ or $E_2$ enable sequences.

The highest priority code is that of a transition vector. Detection of a transition code is initiated by the next sequential enable signal $E_4$. If CODE A, CODE B or CODE C is that of a transition vector, it will be identified by one of three transition detectors 184, 186, 188 which will generate a corresponding $A_2$, $B_2$, $C_2$ enable signal effecting transfer of the identity and code right portions of this transition code into memory 168. A detected transition code thus takes the place of any code entered in this memory during the previous sequences of operation.

The next sequence of operations is initiated by a WRITE enable signal which effects entering the contents of memories 152 and 168 into appropriate addresses in RAM 70". The identity and code left portions of the first boundary code detected, contained in code left memory 152, is transferred into memory address zero. The identity and code right portions of the highest priority code read from a current address $A_n$ into register 140 is transferred from code right memory 168 back into address $A_n$.

The next sequential operation is initiated by a COUNT signal from shift register 142 which increments the RAM address counter 144 to the next sequential address $A_{n+1}$. Upon completion of this operation, the shift register generates a READ signal initiating the transfer of the contents of address $A_{n+1}$ to the multi-code register 140 and the sequence of operations performed by the intensity select logic is repeated. This same sequence of operations is performed for every address in RAM 70".

Implementation of the output processor 76 is illustrated in FIG. 14. While the intensity select logic is selecting the highest priority codes contained in the addresses in RAM 70", the output processor is converting the previously selected codes located in the addresses of RAM 70"' to analog signals controlling the intensity of the raster line in display 74. The output processor sequentially reads the contents of every address in RAM 70"' under the control of the RAM address counter 144 in the intensity select logic. The identity portion of the code read from each address is applied to a line/transition detector 200 and to a boundary detector 202. If a boundary code is identified, detector 202 produces a logical ONE signal enabling the intensity portion of the code to be entered into a boundary code memory 204. This logical ONE is also applied to an input of a NOR gate 206 which in turn produces a logical ZERO applied to an enabling input of an input transfer gate 208. When so enabled, the transfer gate passes the intensity portion of the code through to a D/A converter 210 which produces an analog signal representative of the encoded intensity. This is always the process that occurs when the contents of the first memory address in RAM 70" are read since this address always initializes the raster intensity.

If the identity code read from the current address identifies a line vector or transition vector code, detector 200 produces a logical ONE which is applied to a second input on NOR gate 206 and again a logical ZERO is produced by the NOR gate enabling input transfer gate 208 to pass the line or intensity code from that address through to the D/A converter. Note that this intensity code is not entered into memory 204, however, since the detector 202 does not enable the memory.

Any time a RAM memory address containing no intensity code is read, the last boundary code detected is non-destructively read from the boundary code memory 204 and applied to the D/A converter. This is effected by a memory transfer gate 212 which is only enabled when neither detector 200 nor detector 202 identifies a valid code. When this occurs, both of these detectors apply logical ZERO inputs to NOR gate 206 which in turn produces a logical ONE output enabling the gate 212. Thus, an intensity code is always applied to the D/A converter either directly from the current RAM address being read or from the boundary code memory. As previously described, the analog signal produced by the converter controls the intensity of the beam of display 74.

It can be seen from the above description that the present invention provides a compact display generator having the capability of generating a real-time image, e.g. a real-time contour map image of terrain over which an aircraft is passing. The unit provided can be made small, light and portable without sacrificing the speed necessary to update the display when used on high speed aircraft. This is accomplished by use of special, dedicated processing loops. Further, the fidelity of the image is enhanced by the generation of transition vectors to avoid the stepped appearance of line segments intersecting raster lines at acute angles. This feature of the invention is accomplished without significantly increasing the time required to generate an updated display by unconditionally generating a transition vector code each time a boundary vector or line vector code is transferred to the RAM.

Although specific embodiments of display generators constructed in accordance with the present invention have been disclosed, it is not intended that the invention be restricted to either the specific configurations or the uses disclosed herein. Modifications may be made in a manner obvious to those skilled in the art. For example, a programmed logic array may be utilized in place of the disclosed decision logic unit and intensity select logic. Also, the display generator which forms the subject matter of the present invention is not limited to use on aircraft, but may be advantageously utilized in any environment where its compact size and high speed are desirable features, such as spacecraft, land vehicles, etc. Additionally, the invention need not be restricted to the representation of contour maps, but may be used to represent any image that can be presented on a raster-formed display.

Accordingly, it is intended that the invention be limited only by the scope of the appended claims.

TABLE 1

APPENDIX

MICROPROCESSOR PROGRAM DESCRIPTION

| MACRO PROGRAM | STEP | OPERATION | REGISTER NO.* | PARAMETER |
|---|---|---|---|---|
| | 1 | ENTER $X_V$ | R1 | $X_V$ |
| INITIAL | 2 | ENTER $Y_V$ | R2 | $Y_V$ |
| INPUT | 3 | ENTER cos ψ AND CONVERT | R3 | LOG cos ψ |
| | 4 | ENTER sin ψ AND CONVERT | R4 | LOG sin ψ |
| | 5 | ENTER $X_F$ (24) | | |
| | 6 | ENTER $Y_F$ (24) | | |
| | 7 | ENTER CODE (24) | | |
| START | 8 | ENTER $X_{SP}$ | R6 | $X_{SP\,(MSB)}$ |
| POINT | 9 | ENTER $Y_{SP}$ | R7 | $Y_{SP\,(MSB)}$ |
| | 10 | SUBTRACT: R6 − R1 | R6 | $X_{SP} - X_V$ |
| | 11 | SUBTRACT: R7 − R2 | R7 | $Y_{SP} - Y_V$ |
| | 12 | ENTER CODE N (24) | | |
| | 13 | MOVE $X'_{n-1}$: R10 → R14:(TODLU) | R14 | $X'_{n-1}$ |
| N | 14 | MOVE $Y'_{n-1}$: R11 → R15: (TO DLU) | R15 | $Y'_{n-1}$ |
| Δ WORD | 15 | ENTER $\Delta X_n$ . | R8 | $\Delta X_n$ |
| | 16 | ENTER $\Delta Y_n$ | R9 | $\Delta Y_n$ |
| | 17 | SUM: R8 + R6 | R6 | $X_n$ |
| | 18 | SUM: R9 + R7 | R7 | $Y_n$ |
| | 19 | CONVERT: LOG R6 | R8 | LOG $X_n$ |
| | 20 | CONVERT: LOG R7 | R9 | LOG $Y_n$ |
| | 21 | SUM: R8 + R3: HOLD | — | |
| | 22 | CONVERT: ANTILOG | R10 | $X_n$ cos ψ |
| | 23 | SUM: R9 + R4: HOLD | — | |
| | 24 | CONVERT: ANTILOG | R11 | $Y_n$ sin ψ |
| | 25 | SUM: R9 + R3: HOLD | — | |
| | 26 | CONVERT: ANTILOG | R12 | $Y_n$ cos ψ |
| | 27 | SUM: R8 + R4: HOLD | — | |
| | 28 | CONVERT: ANTILOG | R13 | $X_n$ sin ψ |
| | 29 | SUM: R10 + R11: (TO DLU) | R10 | $X'_n$ |
| | 30 | SUBTRACT: R12 − R13: (TO DLU) | R11 | $Y'_n$ |
| OUT OF FRAME | | REPEAT STEPS 12 → 30 OR 7 → 30 | | |
| | 31 | READ $X'_{n-1}$ → FRAME STORE | — | |
| | 32 | READ $Y_{n-1}$ → FRAME STORE | — | |
| IN | 33 | SUBTRACT: R10 − R14: HOLD | — | |
| FRAME | 34 | CONVERT: LOG (R10 − R14) | R12 | LOG $(X'_{n-1} - X'_n)$ |
| | 35 | SUBTRACT: R12 − R11: HOLD | — | |
| | 36 | CONVERT: LOG (R12 − R11) | R13 | LOG$(Y'_{n-1} - Y'_n)$ |
| | 37 | SUBTRACT: (R12 − R13): HOLD | — | |
| | 38 | CONVERT: ANTILOG | R16 | $\Delta X_n''$ |

TABLE 1-continued

| APPENDIX | | | |
|---|---|---|---|
| MICROPROCESSOR PROGRAM DESCRIPTION | | | |
| 39 | READ: $\Delta x'_n \rightarrow$ FRAME STORE | R16 | $\Delta X_n''$ |

*REFERS TO REGISTERS 36 OF FIG. 3

TABLE 2

MICROPROCESSOR PROGRAM*

| STEP | A RAM | B RAM | SOURCE | ALU | DESTINATION |
|---|---|---|---|---|---|
| 1 | — | 0 | 7 | 3 | 3 |
| 2 | — | 1 | 7 | 3 | 3 |
| 3 | — | 2 | 7 | 3 | 3 |
| 4 | — | 3 | 7 | 3 | 3 |
| 5 | — | — | 7 | 3 | 1 |
| 6 | — | — | 7 | 3 | 1 |
| 7 | — | — | 7 | 3 | 1 |
| 8 | — | 4 | 7 | 3 | 3 |
| 9 | — | 5 | 7 | 3 | 3 |
| 10 | 0 | 4 | 1 | 2 | 3 |
| 11 | 1 | 5 | 1 | 2 | 3 |
| 12 | — | — | 4 | 3 | 3 |
| 13 | 10 | 14 | 4 | 3 | 3 |
| 14 | 11 | 15 | 4 | 3 | 3 |
| 15 | — | 6 | 7 | 3 | 3 |
| 16 | 0 | 7 | 7 | 3 | 3 |
| 17 | 6 | 4 | 1 | 0 | 3 |
| 18 | 7 | 5 | 1 | 0 | 3 |
| 19 | 4 | 6 | 4 | 3 | 3 |
| 20 | 5 | 7 | 4 | 3 | 3 |
| 21 | 2 | 6 | 1 | 0 | 3 |
| 22 | — | 10 | 2 | 3 | 3 |
| 23 | 3 | 7 | 1 | 0 | 3 |

TABLE 2-continued

MICROPROCESSOR PROGRAM*

| STEP | A RAM | B RAM | SOURCE | ALU | DESTINATION |
|---|---|---|---|---|---|
| 24 | — | 11 | 2 | 3 | 3 |
| 25 | 2 | 7 | 1 | 0 | 3 |
| 26 | — | 12 | 2 | 3 | 3 |
| 27 | 3 | 6 | 1 | 0 | 3 |
| 28 | — | 13 | 2 | 3 | 3 |
| 29 | 11 | 10 | 1 | 0 | 3 |
| 30 | 13 | 11 | 1 | 2 | 3 |
| 31 | 14 | 14 | 4 | 3 | 3 |
| 32 | 15 | 15 | 4 | 3 | 3 |
| 33 | 14 | 10 | 1 | 0 | 3 |
| 34 | — | 6 | 2 | 3 | 3 |
| 35 | 15 | 11 | 1 | 2 | 3 |
| 36 | — | 7 | 2 | 3 | 3 |
| 37 | 6 | 7 | 1 | 2 | 3 |
| 38 | — | 17 | 2 | 3 | 3 |
| 39 | 17 | 17 | 4 | 3 | 3 |

*OCTAL

TABLE 3

ENABLE PROGRAM

| STEP | ENABLE (GATE) 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | | | x | | | | | | | x | | | | | | | | | | | | | | |
| 2 | | | x | | | | | | | x | | | | | | | | | | | | | | |
| 3 | | | x | | | x | | | | x | | | | | | | | | | | | | | |
| 4 | | | x | | | x | | | | x | | | | | | | | | | | | | | |
| 5 | | | | | | | | x | | | | | | | | | | | | | | | | |
| 6 | | | | | | | | | x | | | | | | | | | | | | | | | |
| 7 | x | x | | | | | | | | x | | x | | | | | | | | | | | | |
| 8 | x | x | | x | | | | | | | | | | | | | | | | | | | | |
| 9 | x | x | | x | | | | | | | | | | | | | | | | | | | | |
| 10 | | | | | | | | | | | | | | | | | | | | | | | | |
| 11 | | | | | | | | | | | | | | | | | | | | | | | | |
| 12 | x | x | | | | | | | | | | | | | | | | | | | | | x | |
| 13 | | | | | | | | x | | | x | | | | | | | | | | | | | |
| 14 | | | | | | | | | x | | x | | | | | | | | | | | | | |
| 15 | x | x | | | x | | | | | | | | | | | | | | | | | | | |
| 16 | x | x | | | x | | | | | | | | | | | | | | | | | | | |
| 17 | | | | | | | | | | | | | | | | | | | | | | | | |
| 18 | | | | | | | | | | | | | | | | | | | | | | | | |
| 19 | | | | | | x | | | | | | | | | | | | | | | | | | |
| 20 | | | | | | x | | | | | | | | | | | | | | | | | | |
| 21 | | | | | | | | | | | | | | | | | | | | | | | | |
| 22 | | | | | | | x | | | | | | | | | | | | | | | | | |
| 23 | | | | | | | | | | | | | | | | | | | | | | | | |
| 24 | | | | | | | x | | | | | | | | | | | | | | | | | |
| 25 | | | | | | | | | | | | | | | | | | | | | | | | |
| 26 | | | | | | | x | | | | | | | | | | | | | | | | | |
| 27 | | | | | | | | | | | | | | | | | | | | | | | | |
| 28 | | | | | | | x | | | | | | | | | | | | | | | | | |
| 29 | | | | | | | | x | | | x | | | | | | | | | | | | | |
| 30 | | | | | | | | | x | | x | | | | | | | | | x | | | | |
| 31 | | | | | | | | | | | | | | | | x | | | x | | | | | |
| 32 | | | | | | | | | | | | | | | | | x | | x | | | | | |
| 33 | | | | | | | | | | | | | | | | | | | | | | | | |
| 34 | | | | | | x | | | | | | | | | | | | | | | | | | |
| 35 | | | | | | | | | | | | | | | | | | | | | | | | |
| 36 | | | | | | x | | | | | | | | | | | | | | | | | | |
| 37 | | | | | | | | | | | | | | | | | | | | | | | | |
| 38 | | | | | | | | | | | | | | | | | | | | | | | | |
| 39 | | | | | | | | | | | | | x | x | x | | | | x | x | | | | |

I claim:

1. A digital display generator of the type wherein data, including stored data words describing characteristics of line segments utilizable to construct a predefined image, is processed to produce a digital control signal employed to effect presentation of a selected portion of said image on a raster display, said line segments including line vectors representative of elongated features of said image and boundary vectors identifying boundaries between image areas of different brightness, each of said data words including X,Y coordinate data for defining the location of the end points of one of said line segments and a code defining either the intensity of said line segment if it is a line vector, or the brightness of the image areas on opposite sides of said line segment if it is a boundary vector, said generator comprising:

(a) a decision unit for selecting all of said stored data words describing line segments having an end point within said selected portion of the image;

(b) a processor unit for performing predefined macrosteps, including arithmetic manipulations on the data words selected by the decision unit, said manipulations including determining the change $\Delta X$ of X, where $\Delta X$ is the change per $\Delta Y$ of each line segment described by said detected data words and where $\Delta Y$ is the distance between adjacent raster lines;

(c) a frame memory for storing said selected data words and data representative of $\Delta X$ determined by said processor unit;

(d) comparator means for reading all data in the frame memory prior to presentation of each raster line by the raster display and detecting all data words in said frame memory which describe line segments intersecting the raster line;

(e) means responsive to the codes included in the detected words to produce the digital control signal; and (f) updating means adapted to substitute for the the X-coordinate $X_n$ of each of said stored words detected a new value $X_n+\Delta X_n$ to locate the intersection of the line segment described by said word with the raster line to be presented following that on which the intersection occurs at $X_n$.

2. A digital display generator as in claim 1, wherein said processor unit is further adapted to perform macrosteps to determine the slope ($\Delta Y/\Delta X$) of each line segment selected by said decision unit and wherein said comparator means is adapted to produce additional data words describing an extension along each raster line of the intersection therewith by each of the selected line segments having a slope less than a predetermined magnitude.

3. A digital display generator as in claim 2, wherein each additional data word produced by the comparator means includes a code defining the brightness of the extension to be equal to the intensity of the associated line segment if said segment is a line vector and defining the brightness to be equal to the average of the brightness of the image areas on opposite sides of the associated line segment if said segment is a boundary vector.

4. A digital display generator of the type wherein data words are employed to define characteristics of line segments utilizable to construct a predefined image and wherein a digital control signal is used to effect presentation of a selected portion of said image on a raster display, said line segments being defined by line vectors representative of elongated features of said image and by boundary vectors identifying the boundary between image areas of different brightness, each of said data words including X,Y coordinate data for defining the locations of the end points of one of said vectors and a code defining either vector intensity if said vector is a line vector, or brightness of the image areas on opposite sides of the corresponding boundary if said vector is a boundary vector, said generator comprising:

(a) a data store for storing data including said data words;

(b) a processor unit for performing macrosteps including arithmetic manipulations with respect to said data words, said manipulations including the determination of $\Delta X$ of the corresponding vectors, where $\Delta X$ is the increase of the X coordinate per unit of Y coordinate;

(c) a decision unit;

(d) a data path for coupling said data store directly to an input of said decision unit; said decision unit being adapted to route data words within said generator and to provide order signals at the output of said decision unit in response to signals applied to inputs thereof at least by said data store and said processor unit;

(e) a program memory coupled to said decision unit and to said processor unit and adapted to store a plurality of macrosteps each defining a plurality of microsteps, said program memory being responsive to said order signals to effect execution by said processor unit of predetermined ones of said macrosteps;

(f) a frame memory coupled to said processor unit for storing data words and data representative of $\Delta X$ routed thereto by said decision unit;

(g) comparator means for reading all data in the frame memory prior to presentation of each raster line by the raster display and detecting all data words in said frame memory which define a vector intersecting the raster line;

(h) means responsive to said brightness and intensity codes of said detected data words to generate said digital control signal; and (i) updating means adapted to substitute for the X-coordinate $X_n$ of each of the detected data words the new value $X_n+\Delta X_n$ to locate the intersection of the line segment described by said data word with the raster line to be presented following that on which the intersection occurs at $X_n$.

* * * * *